(12) United States Patent
Lee et al.

(10) Patent No.: US 11,189,274 B2
(45) Date of Patent: Nov. 30, 2021

(54) DIALOG PROCESSING SYSTEM, VEHICLE HAVING THE SAME, DIALOG PROCESSING METHOD

(71) Applicants: Hyundai Motor Company, Seoul (KR); Kia Motors Corporation, Seoul (KR)

(72) Inventors: Jeong-Eom Lee, Yongin-si (KR); DongSoo Shin, Suwon-si (KR); Seona Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/131,330

(22) Filed: Sep. 14, 2018

(65) Prior Publication Data

US 2019/0287520 A1 Sep. 19, 2019

(30) Foreign Application Priority Data

Mar. 19, 2018 (KR) .......................... 10-2018-0031463

(51) Int. Cl.
| | |
|---|---|
| *G10L 15/00* | (2013.01) |
| *G10L 15/22* | (2006.01) |
| *G10L 15/18* | (2013.01) |
| *G10L 13/00* | (2006.01) |
| G10L 15/183 | (2013.01) |

(52) U.S. Cl.
CPC .............. *G10L 15/22* (2013.01); *G10L 13/00* (2013.01); *G10L 15/1815* (2013.01); *G10L 15/183* (2013.01); *G10L 15/1822* (2013.01); *G10L 2015/223* (2013.01); *G10L 2015/228* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,792,015 | B2 * | 10/2017 | Baer | ................... G06F 3/04817 |
| 9,798,799 | B2 * | 10/2017 | Wolverton | .............. G10L 15/22 |
| 2014/0272821 | A1 | 9/2014 | Pitschel et al. | |
| 2017/0116982 | A1 * | 4/2017 | Gelfenbeyn | .............. G06F 3/16 |

FOREIGN PATENT DOCUMENTS

| | | |
|---|---|---|
| JP | 2015-501022 A | 1/2015 |
| JP | 2016-001461 A | 1/2016 |
| KR | 10-2012-0138826 A | 12/2012 |
| KR | 10-2015-0032711 A | 3/2015 |
| KR | 10-2015-0034785 A | 4/2015 |

* cited by examiner

*Primary Examiner* — Vu B Hang
(74) *Attorney, Agent, or Firm* — Morgan, Lewis & Bockius LLP

(57) ABSTRACT

A dialog processing system may include a communication device configured to receive information sent from the outside and circumstantial information; a storage configured to store a rule and a dialog template related the rule; a rule determiner configured to compare a condition of the rule and the information to generate a determined rule; a situation determiner configured to determine to express the determined rule based on the determined rule and circumstantial information collected from the outside; and a result processor configured to generate text to be expressed based on the determined rule and the dialog template and output the text according to a signal sent from the situation determiner.

21 Claims, 21 Drawing Sheets

DIALOG PROCESSING SYSTEM, VEHICLE HAVING THE SAME, DIALOG PROCESSING METHOD

CROSS-REFERENCE TO RELATED APPLICATION

The present application claims priority to Korean Patent Application No. 10-2018-0031463 filed on Mar. 19, 2018, in the Korean Intellectual Property Office, the entire contents of which is incorporated herein for all purposes by this reference.

BACKGROUND OF THE INVENTION

Field of the Invention

The present invention relates to a dialog processing system, vehicle having the same, and dialog processing method, for starting a verbal dialog with the user first based on information collected from the vehicle and prompting a reply from the user, providing information or services required for the user.

Description of Related Art

Vehicles typically provide visual information and as various services as the vehicle can do at the request of the user. The services are started when the user makes physical input through input devices, e.g., buttons, disposed in the vehicle or makes audible input, such as making voice.

However, since the services have one-sided relations in which the user first makes an input for the vehicle to provide the service as feedback, there are fundamental limits on supporting various services.

If the vehicle first prompts a request for a service or starts a dialog that provides information by itself, the kinds and quality of services to be provided for the user may be significantly increased.

Determining a starting point and topic of a dialog by a system, unlike the human dialog, has various variables in a very wide range. However, the present invention may narrow down the variables depending on the service provided in an environment, e.g., the vehicle, so if the system first starts a dialog which is required for providing a service, it is expected that the quality and kinds of services required for the user may be significantly increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dialog processing system, vehicle having the same, and dialog processing method, by which the system first starts a dialog with the user by determining a rule and condition to start the dialog, in which circumstantial information collected is set in advance.

In accordance with an aspect of the present invention, a dialog processing system is provided. The dialog processing system may include a communication device configured to receive information sent from the outside and circumstantial information; a storage configured to store a rule and a dialog template related the rule; a rule determiner configured to compare a condition of the rule and the information to generate a determined rule; a situation determiner configured to determine to express the determined rule based on the determined rule and circumstantial information collected from the outside; and a result processor configured to generate text to be expressed based on the determined rule and the dialog template and output the text according to a signal sent from the situation determiner.

The rule determiner may insert the information to the determined rule and store the resultant determined rule in the storage.

The situation determiner may determine a cognitive load value of a user and duration time based on the circumstantial information.

The situation determiner may set priority on each of a plurality of determined rules stored by comparing the determined cognitive load value and a reference cognitive load value included in the determined rule.

The situation determiner may set priority on each of a plurality of determined rules stored by comparing utterance time included in the determined rule and the duration time.

The rule determiner may determine the rule as the determined rule when a condition included in the rule corresponds to the information.

The rule determiner may select one of events stored in the storage based on the information.

The rule determiner may determine whether there is a plurality of rules associated with the event.

The rule determiner may determine one of the plurality of rules associated with the event as the determined rule when the rule has a condition corresponds to the information.

The result processor may determine information included in the determined rule as a factor to be inserted to the text.

The result processor may generate the rule based on a reply of a user and compare the rule with a rule stored in the storage.

The situation determiner may send the signal to the result processor based on priorities of a plurality of determined rules stored in the storage.

In accordance with another aspect of the present invention, a dialog processing method is provided. The dialog processing method may include receiving information sent from the outside and circumstantial information; storing a rule and a dialog template related the rule; comparing a condition of the rule and the information to generate a determined rule; determining to express the determined rule based on the determined rule and circumstantial information collected from the outside; and creating text to be expressed based on the determined rule and the dialog template and outputting the text according to a signal generated while determining to express the determined rule.

The creating of the determined rule may include inserting the information to the determined rule and storing the resultant rule in a storage.

The determining of expressing the determined rule may include determining a cognitive load value of a user and duration time based on the circumstantial information.

The determining of expressing the determined rule may include setting priority on each of a plurality of determined rules stored by comparing the determined cognitive load value and a reference cognitive load value included in the determined rule.

The determining of expressing the determined rule may include setting priority on each of a plurality of determined rules stored by comparing utterance time included in the determined rule and the duration time.

The determining of expressing the determined rule may include determining the rule as the determined rule when a condition included in the rule corresponds to the information.

The determining of expressing the determined rule may include selecting one of events stored in the storage based on the information.

The determining of expressing the determined rule may include determining whether there is a plurality of rules associated with the event.

The determining of expressing the determined rule may include determining one of the plurality of rules associated with the event as the determined rule when the rule has a condition corresponds to the information.

The outputting of the text may include inserting information included in the determined rule to the text.

The outputting of the text may include creating the rule based on a reply of a user and comparing the rule with a rule stored in the storage.

In accordance with another aspect of the present invention, a vehicle is provided. The vehicle may include a communication device configured to receive information sent from the outside and circumstantial information sent from the vehicle; a storage configured to store a rule and a dialog template related the rule; a rule determiner configured to compare a condition of the rule and the information to generate a determined rule; a situation determiner configured to determine to express the determined rule based on the determined rule and circumstantial information collected from the vehicle; and a result processor configured to generate text to be expressed based on the determined rule and the dialog template and output the text through a controller of the vehicle according to a signal sent from the situation determiner.

The situation determiner may determine a cognitive load value of a user and duration time based on the circumstantial information sent from the vehicle.

The situation determiner may set priority on each of a plurality of determined rules stored by comparing the determined cognitive load value and a reference cognitive load value included in the determined rule and comparing utterance time included in the determined rule and the duration time.

The situation determiner may select the priority based on the reference cognitive load value when overlapping rules are selected based on the comparison results.

The result processor may control a vehicle controller included in the vehicle to output the text and control the vehicle controller to provide a service related to the determined result.

The rule determiner may collect driving condition information related to a user from the vehicle controller and compare a condition of the rule and the driving condition information.

The result processor may determine information included in the determined rule as a factor to be inserted to the text The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
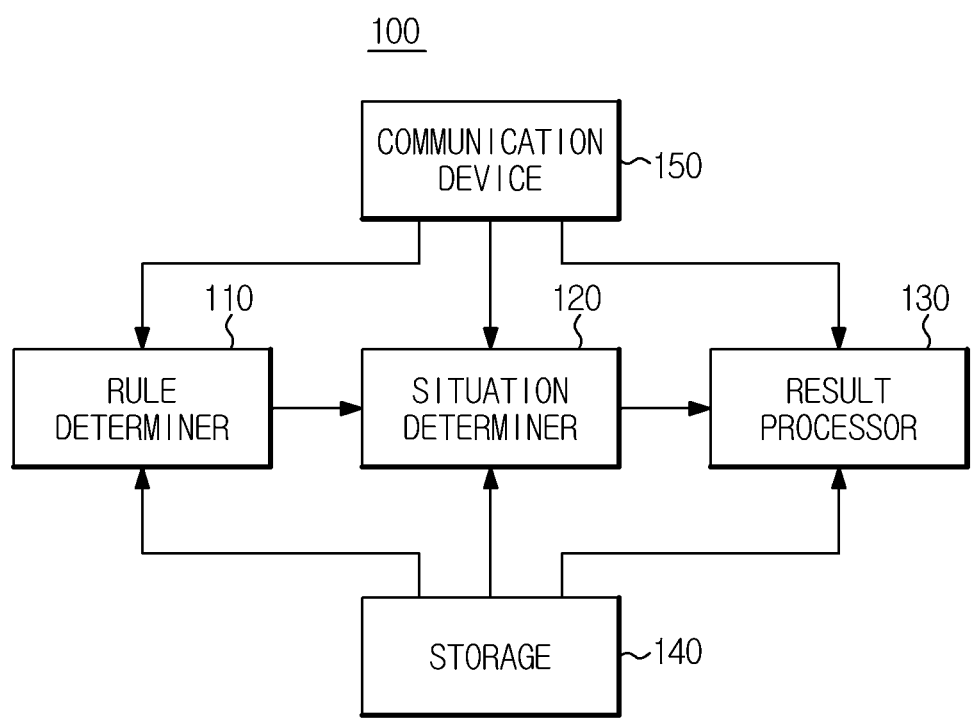
FIG. 1 is a control block diagram of a dialog processing system, according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Like numerals refer to like elements throughout the specification. Not all elements of embodiments of the present invention will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Reference numerals used for method steps are just used to identify the respective steps, but not to limit an order of the steps. Thus, unless the context clearly dictates otherwise, the written order may be practiced otherwise.

Embodiments of a dialog processing system, vehicle having the same, and dialog processing method will now be described with reference to accompanying drawings.

A dialog processing system in accordance with various exemplary embodiments of the present invention is a device configured for providing a service of starting a dialog using the circumstantial information collected. In the exemplary embodiment of the present invention, the service provided for the user may include any operation which is performed to meet the user's need or intention, such as providing information, controlling the vehicle, performing audio/video/navigation functions, providing content fetched from the outside, etc.

Furthermore, the dialog processing system may provide a dialog processing technology specialized in vehicle environments to accurately grasp the user's intention in the special circumstance, such as in the vehicle.

A gateway connecting the dialog processing system and the user may be a vehicle or a mobile device connected to the vehicle. As will be described later, the dialog processing system may be provided in the vehicle, or in a remote server located outside the vehicle for exchanging data by communicating with the vehicle or the mobile device connected to the vehicle.

Alternatively, some of the components of the dialog processing system are provided in the vehicle while some thereof are provided in the remote server, so that the operation of the dialog processing system may be partially performed in the vehicle and partially in the remote server.

FIG. 1 is a control block diagram of a dialog processing system, according to an exemplary embodiment of the present invention.

Referring to FIG. 1, a dialog processing system 100 includes a rule determiner 110 for determining an event and a rule based on circumstantial information collected and creating a topic for a dialog, a situation determiner 120 for determining the start of a dialog with the determined rule based on the circumstantial information, and a result processor 130 for creating text from the rule with which starting a dialog is determined and outputting the dialog.

The dialog processing system 100 also includes a communication device 150 to collect circumstantial information and a storage 140 to store the rule and the dialog text.

The rule determiner 110 monitors various information collected by the communication device 150 and determines an event and rule that suits the content. The rule as herein used includes a condition and a consequence, and generated in advance and stored in the storage 140.

Once the rule determiner 110 determines a rule included in an event, the rule becomes the topic of a dialog to be started for the user by the dialog processing system 100. The rule determiner 110 sends the topic of the dialog, i.e., the determined rule, to the situation determiner 120.

The situation determiner 120 determines which one of the various dialog topics stored in the storage 140, i.e., of the rules determined in advance, is to be selected. Furthermore, in addition to selecting the topic of the dialog to be started, the situation determiner 120 determines at what point in time the dialog is to be started.

Accordingly, the situation determiner 120 collects circumstantial information through the communication device 150 to start a dialog with the determined rule, and based on the collection of the circumstantial information, selects a point in time to start the dialog.

Once the determined rule with which to start a dialog and the starting time are determined, the situation determiner 120 sends the determined rule selected to the result processor 130. The result processor 130 determines dialog policy to which the factors contained in the determined rule are inserted, and generates text to start the dialog. Moreover, the result processor 130 may output the text while controlling various components connected to the dialog processing system to provide an associated service.

The storage 140 stores a variety of data required for the dialog processing system 100 to start a dialog.

For example, the storage 140 stores various circumstantial information collected through the communication device 150 and the rules generated in advance and determined rules. It also stores various control algorithms required to control dialog policies and elements required to generated text.

The storage 140 may further store data detected by sensors provided in the vehicle and various information such as profile information relating to the user. The information to be stored in the storage 140 will be described in more detail later.

The communication device 150 is a passage through which to collect the circumstantial information and other various information, and may include one or more components that enable communication with a sub device, for example, at least one of a short-range communication module, a wired communication module, and a wireless communication module.

The short-range communication module may include various short range communication modules for transmitting and receiving signals within a short range over a wireless communication network, such as Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (WiFi) module, a wireless broadband (Wibro) module, and/or any wireless communication device configured for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The communication device 150 may include various configurations and modules to collect information from the outside, in addition to the aforementioned features.

Figure 2:
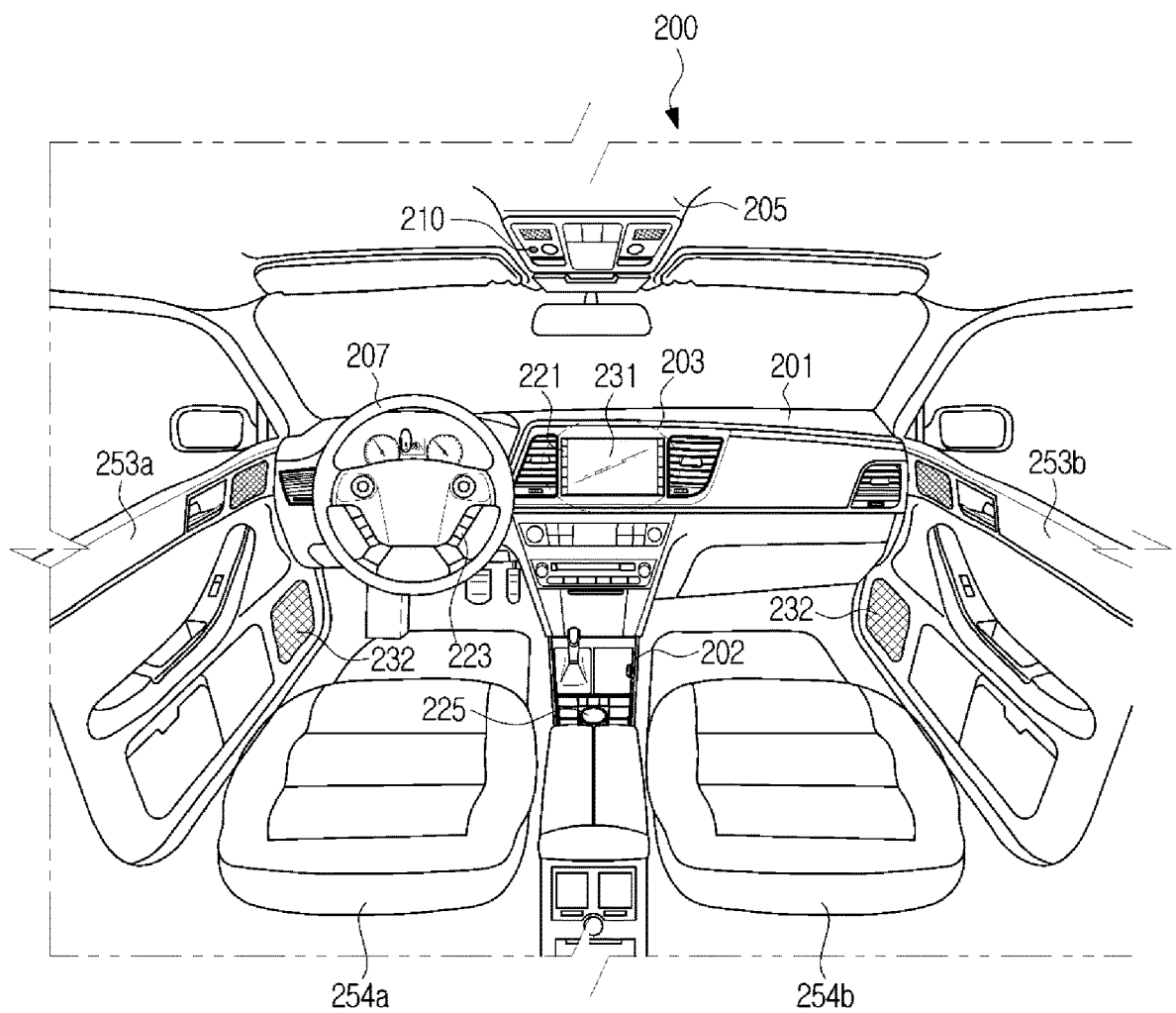
FIG. 2 shows the internal of a vehicle.

FIG. 2 shows the internal of a vehicle.

Referring to FIG. 2, a center fascia 203 located in the center area of a dashboard 201 of a vehicle 200 may have a display 231 for displaying screens required to perform control of the vehicle including audio playing, video playing, navigation, or calling functions, and an input button 221 for receiving a control command from the user.

For the driver's convenience for manipulation, a steering wheel 207 may also have an input button 223, and a jog shuttle 225 acting as an input button may be provided in a center console area 202 between a driver's seat 254*a* and a passenger's seat 254*b*.

The module including the display 231, the input button 221, and a processor for controlling overall functions may be referred to as an Audio Video Navigation (AVN) terminal or a head unit.

The display 231 may be implemented as one of various display devices, such as Liquid Crystal Displays (LCDs), Light Emitting Diodes (LEDs), Plasma Display Panels (PDPs), Organic Light Emitting Diodes (OLEDs), Cathode Ray Tubes (CRTs), or the like.

The input button 221 may be implemented in a hard key type in an area adjacent to the display 231, as shown in FIG. 2. If the display 231 is implemented in a touch screen type, the display 231 may also serve as the input button 221.

The vehicle 200 may receive the user's command in a voice through a voice input device 210. The voice input device 210 may include a microphone that converts an input sound to an electric signal and outputs the electric signal.

To receive a sound input more effectively, the voice input device 210 may be provided in a headlining 205, as shown in FIG. 2, or in the dashboard 201 or steering wheel 207, without being limited thereto. Besides, the voice input device 210 may be disposed at any place which is proper to receive the user's voice.

The vehicle 200 may be provided with a speaker 232 for outputting sounds required to form a dialog with the user or provide a service desired by the user. For example, the speaker 232 may be provided inside a door 253*a* on the side of the driver's seat or a door 253*b* on the side of the passenger's seat.

The speaker 232 is a device configured for outputting voice for giving navigation route directions, sound or voice included in audio/video contents. In the case that the vehicle 200 includes the dialog processing system 100 in particular, the dialog processing system 100 may start the determined dialog for the user through the speaker 232, and may also output a word generated as an answer to the feedback of the user.

In an exemplary embodiment of the present invention, the dialog processing system 100 may provide a service optimized for the lifestyle of the user using a dialog processing technology specialized for the vehicle environment, and make up a new service using a technology such as the Connected Car, Internet of things (IoT), artificial intelligence (AI).

With the dialog processing system 100 specialized for the vehicle environment, the driver may easily understand and cope with the main context when the driver drives by his or her self. For example, the dialog processing system 100 may determine a current state of the user through various sensors provided in the vehicle 200 and determine a point in time to start a dialog accordingly.

Figure 3:
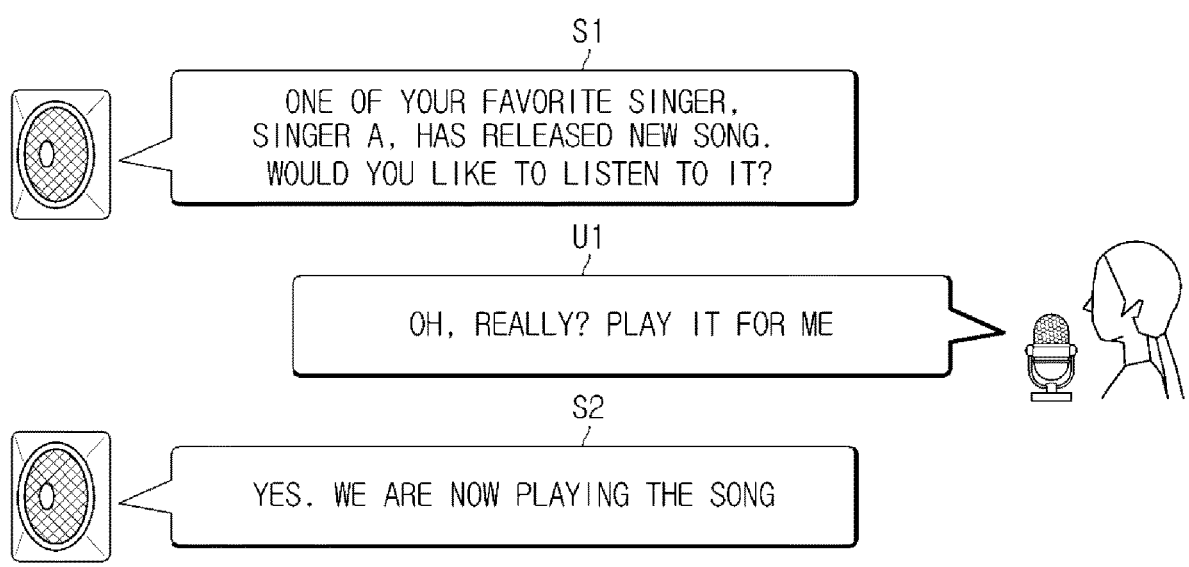
FIG. 3 and FIG. 4 show examples of dialog which may be made between a dialog processing system and the driver.
Figure 4:
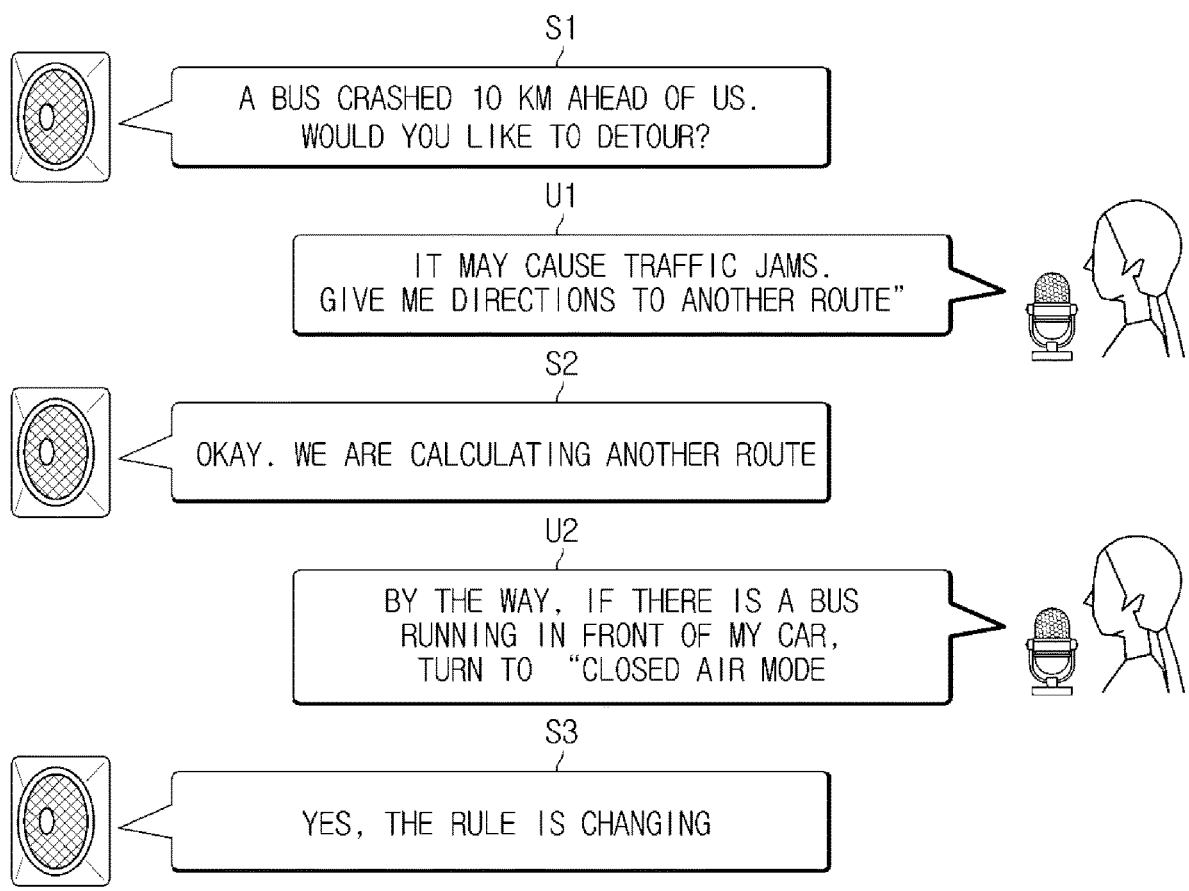

FIG. 3 and FIG. 4 show examples of dialog which may be made between a dialog processing system and the driver.

Referring to FIG. 3, the dialog processing system 100 may output a word as a starter of a dialog based on circumstantial information collected, e.g., "A new song of your favored singer has just been released. Would you like to listen to it?" (S1).

The user may input a word that responds to the topic that the dialog processing system 100 starts, e.g., "Oh, really? Play it for me" (U1), and the dialog processing system 100 may output a word as a result of recognizing the user's reply, e.g., "We are now playing the song" (S2).

There may be various words to be output by the dialog processing system 100 depending on the circumstantial information, and it is also possible to select the topic of a dialog at the request of the user.

Referring to FIG. 4, the dialog processing system 100 may collect accident information and output a word to provide the associated information, e.g., "A bus crashed 10 Km ahead of us. Would you like to detour?" (S1).

The user may input a word as a reply, e.g., "It may cause traffic jams. Give me directions to another route" (U1). The dialog processing system 100 may output a word in a response to the reply of the user, e.g., "Okay. We are determining another route" (S2).

In the meantime, while having the dialog with the dialog processing system 100, the user may input a word to request the dialog processing system 100 for a change in rule according to the content of the dialog "bus", e.g., "By the way, if there is a bus running in front of my car, turn to "closed air mode" (U2).

The dialog processing system 100 may analyze the input from the user, generate a rule required for the next dialog, and output a word to respond to the user's request, e.g., "Yes, the rule is changing" (S3).

In the present way, the dialog processing system 100 may first start a dialog with the user based on circumstantial information and provide various services preemptively that meet actual intentions of the user. Furthermore, the dialog processing system 100 may manage a wide range of dialog topics that are made after the user's request.

Figure 5:
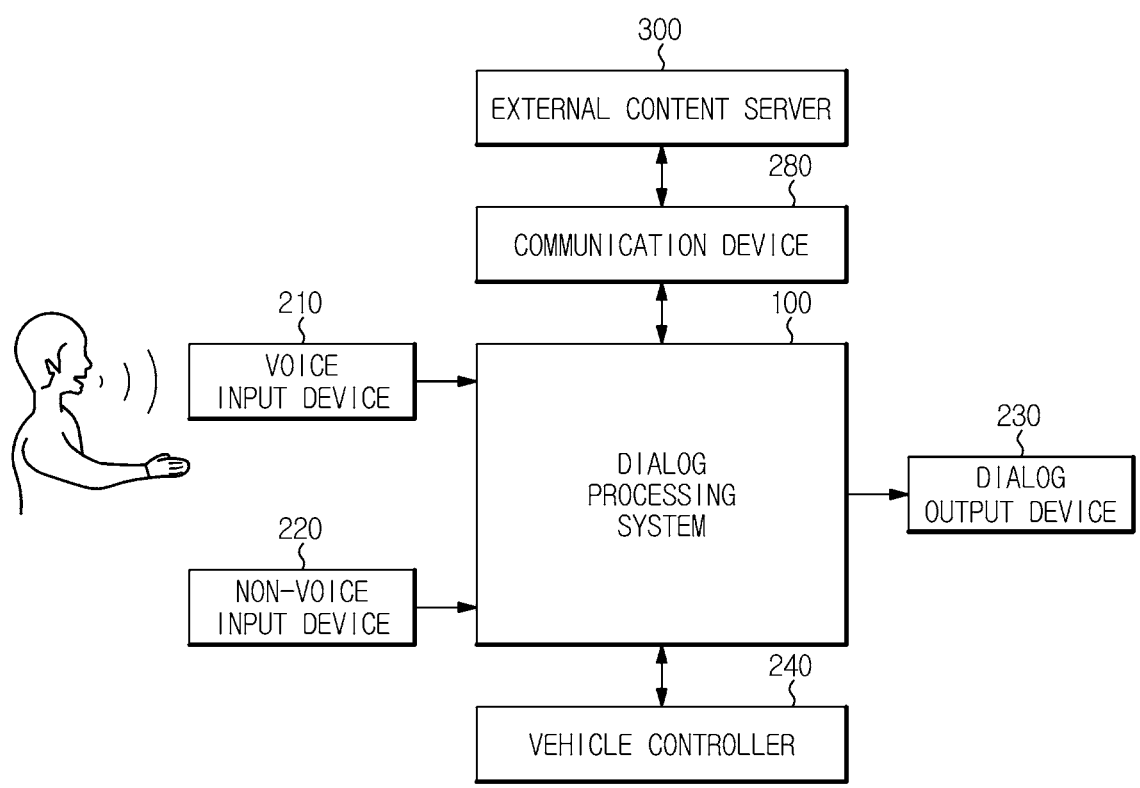
FIG. 5 is a schematic control block diagram illustrating connections between a dialog processing system and components of a vehicle.

FIG. 5 is a schematic control block diagram illustrating connections between a dialog processing system and components of a vehicle.

Referring to FIG. 5, the user's voice may be input to the dialog processing system 100 through the voice input device 210 provided in the vehicle 200. As described above in connection with FIG. 2, the voice input device 210 may include a microphone disposed within the vehicle 200.

Other inputs than the voice of the user may be input through a non-voice input device 220. The non-voice input device 220 may include the input buttons 221 and 223 and the jog shuttle 225 for receiving commands from the user by being manipulated by the user.

The non-voice input device 220 may also include a camera for taking an image of the user. With the image captured by the camera, the user's gesture, look, or direction of the gaze used as a means of a command input may be recognized. It is also possible to grasp the state of the user (e.g., drowsiness) from the image captured by the camera.

Information related to the vehicle may be input to the dialog processing system 100 through a vehicle controller

240. The information related to the vehicle may include information related to a state of the vehicle obtained by various sensors provided in the vehicle 200, information related to a surrounding situation, and/or information stored in the vehicle 200 by default, such as the fuel type of the vehicle.

The dialog processing system 100 determines a rule required for a dialog and selects a point in time to start a word for the dialog based on the user's voice input through the voice input device 210, the user's non-voice input through the non-voice input device 220, various information input to the vehicle controller 240.

A dialog output device 230 is a device configured for providing visual, audible, or haptic outputs to the counter part of the dialog, and may include the display 231 and the speaker 232. The display 231 and the speaker 232 may visually and audibly output an answer to what the user says, a question for the user, or the information requested by the user. It is also possible to output vibrations by mounting a vibrator on the steering wheel 207.

The vehicle controller 240 may control the vehicle 200 to carry out a consequence derived from the content of a word selected by the dialog processing system 100 and the reply of the user.

The vehicle 200 may collect and send the dialog processing system 100 not only the data obtained by the sensors provided in the vehicle 200 but also various circumstantial information, such as circumstantial information obtained from an external content server 300 or an external device, e.g., traffic situations, weather conditions, temperatures, information related to fellow passengers, personal information related to the driver, etc.

The circumstantial information obtained from the outside through Vehicle to Everything (V2X) may be input to the dialog processing system 100 through a communication device 280 and the vehicle controller 240. The V2X refers to a vehicle exchanging and sharing various useful information, such as traffic conditions while driving and communicating with the road infrastructure and other vehicles.

The V2X communication may include Vehicle-to-Infrastructure (V2I) communication, Vehicle-to-Vehicle (V2V) communication, and Vehicle-to-Nomadic devices (V2N) communication. Accordingly, with the V2X communication, vehicles are able to communicate with one another or with infrastructure disposed on the road to exchange information related to traffic ahead, information related to approaching of other vehicles or possibility of collision, etc., and give the driver the information.

Such driving environment information input to the dialog processing system 100 may include information related to the traffic ahead, information related to approaching of a nearby vehicle, warning of a collision with other vehicle, information related to real-time traffic condition, information related to unpredictable situations, information related to a state of traffic flow control, etc.

Although not shown, the signals obtained by the V2X may also be input to the vehicle 200 through the communication device 280.

The vehicle controller 240 may include a memory for storing a program for carrying out the aforementioned operations and the following operations, and a processor for executing the program. The memory and the processor may each be provided as a single one. Otherwise, if there is a plurality of memories and processors, they may be integrated in a single chip or may be physically separated.

Figure 6:
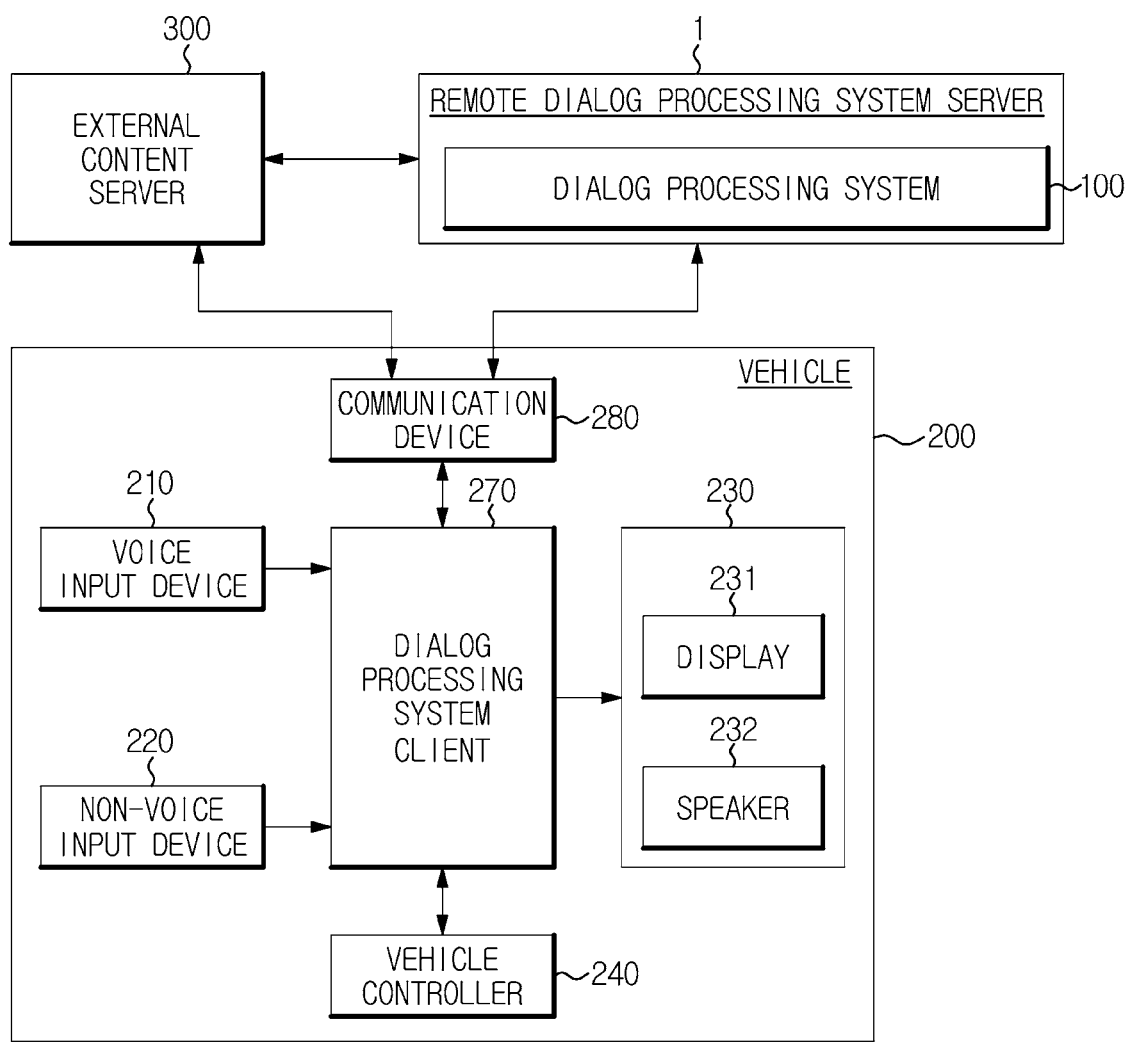
FIG. 6 is a control block diagram of a vehicle gateway mechanism in which a dialog processing system is provided in a remote server and a vehicle is configured as a gateway to link the user and the dialog processing system.

FIG. 6 is a control block diagram of a vehicle gateway mechanism in which a dialog processing system is provided in a remote server and a vehicle is configured as a gateway to link the user and the dialog processing system.

In the vehicle gateway mechanism, as shown in FIG. 6, a remote dialog processing system server 1 is provided outside the vehicle 200, and the vehicle 200 includes a dialog processing system client 270 connected to the remote dialog processing system server 1 through the communication device 280. The communication device 280 is configured as a gateway to link the vehicle 200 and the remote dialog processing system server 1.

The dialog processing system client 270 is configured as an interface connected to an input/output (I/O) device and perform collecting and exchanging data.

When the voice input device 210 and the non-voice input device 220 provided in the vehicle 200 receive and forward a user input to the dialog processing system client 270, the dialog processing system client 270 may send the input data to the remote dialog processing system server 1 through the communication device 280.

The vehicle controller 240 may also forward the data collected by the sensors provided in the vehicle 100 to the dialog processing system client 270, and the dialog processing system client 270 may send the collected data to the remote dialog processing system server 1 through the communication device 280.

The remote dialog processing system server 1 may be provided with the aforementioned dialog processing system 100 to both perform handling the dialog based on the result of processing the input data and perform handing the result based on the result of handling the dialog.

The remote dialog processing system server 1 may fetch information or content required to process the input data, manage the dialog, or handle the result, from an external content server 300.

The vehicle 200 may also fetch content needed to provide a service required for the user in a response to a reply sent from the remote dialog processing system server 1 from the external content sever 300.

Figure 7:
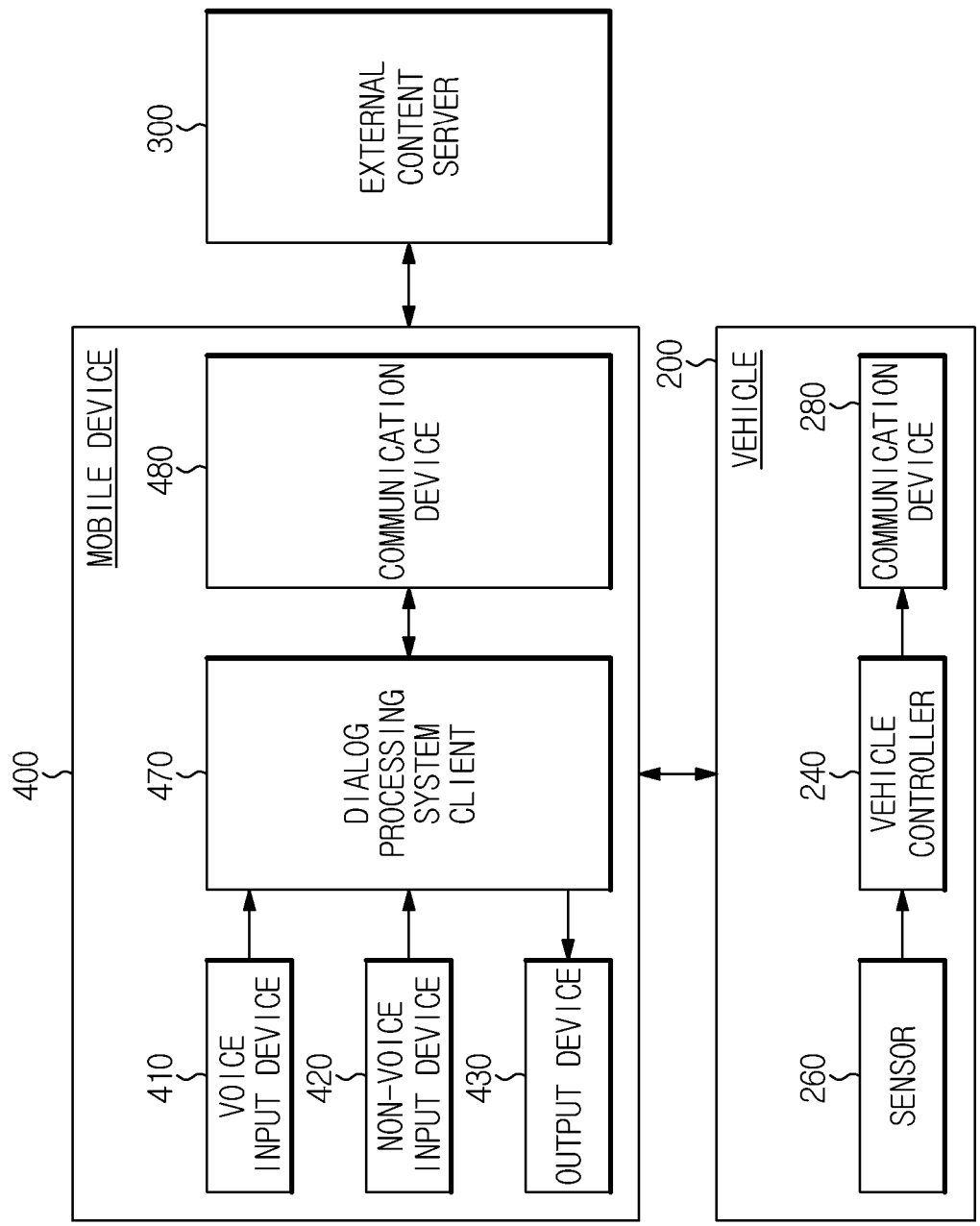
FIG. 7 is a control block diagram of a mobile gateway mechanism, in which a mobile device connected to a vehicle links the user and a remote dialog processing system server.

FIG. 7 is a control block diagram of a mobile gateway mechanism, in which a mobile device connected to a vehicle links the user and a remote dialog processing system server.

In the mobile gateway mechanism, as shown in FIG. 7, a mobile device 400 receives vehicle condition information and driver condition information and forwards the received condition information to the remote dialog processing system server 1. That is, the mobile device 400 is configured as a gateway to link the user and the remote dialog processing system server 1 or the vehicle 200 and the remote dialog processing system server 1.

The mobile device 400 may be an electronic device which may be carried around to exchange data by communication with an external server and a vehicle, such as a smart phone, a smart watch, smart glasses, a personal digital assistant (PDA), a tablet personal computer (PC), etc.

The mobile device 400 includes a voice input device 410 for receiving the user's voice, a non-voice input device 420 for receiving non-voice input from the user, an output device 430 for outputting a visual, audible, or haptic response, a communication device 480 for exchanging data by communicating with the remote dialog processing system server 1 and the vehicle 200, and a dialog processing system client 470 for collecting data input from the vehicle 200 and the user and forwarding the data to the remote dialog processing system server 1 through the communication device 480.

The voice input device 410 may include a microphone that converts an input sound to an electric signal and outputs the electric signal.

The non-voice input device 420 may include an input button, a touch screen, or a camera provided in the mobile device 400.

The output device 430 may include a display, a speaker, or a vibrator provided in the mobile device 400.

For an I/O interface for the user, not only the voice input device 410, the non-voice input device 420, and the output device 430 provided in the mobile device 400 but also the voice input device 210, the non-voice input device 220, and the dialog output device 230 provided in the vehicle 200 may also be used.

The vehicle 200 forwards the data detected by a sensor and the user input to the mobile device 400, and the dialog processing system client 470 of the mobile device 400 forwards them to the remote dialog processing system server 1.

Furthermore, the dialog processing system client 470 may forward a response or an instruction sent from the remote dialog processing system server 1 to the vehicle 200.

For example, the dialog processing system client 470 may use the speaker 232 provided in the vehicle 200 to start a dialog or may output a dialog using the output device 430 provided in the mobile device 400.

A vehicle control command which may be made along with the dialog may be sent to the vehicle 200 through the mobile device 400, and the vehicle controller 240 may perform control corresponding to the command to provide a service required for the user.

The dialog processing system client 470 may not only collect and forward the input data to the remote dialog processing system server 1, but also perform portion or all of the functions of the rule manger 110 and the result processor 130 of the dialog processing system 100.

FIG. 5, FIG. 6 and FIG. 7 show an example, in which the dialog processing system 100 is applied to a vehicle and/or various environments other than the vehicle to provide a service. How the dialog processing system 100 first starts a dialog will now be described in detail based on the previous embodiments in connection with FIG. 3 and FIG. 4.

Figure 8:
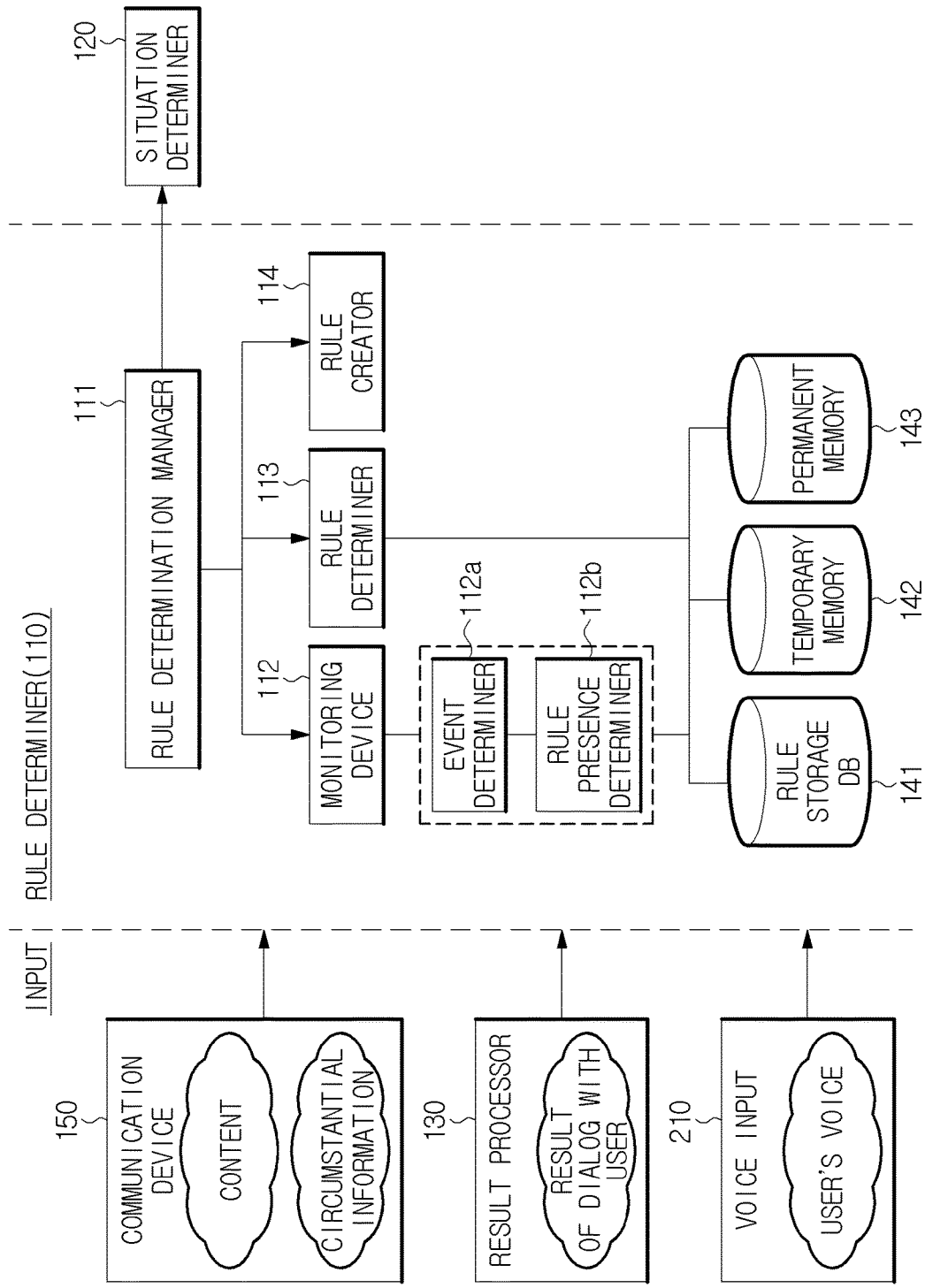
FIG. 8 is a control block diagram of a dialog processing system, in which the configuration of a rule determiner is specified.

FIG. 8 is a control block diagram of a dialog processing system, in which the configuration of a rule determiner is specified.

Referring to FIG. 8, the rule determiner 110 includes a monitoring device 112 for observing various information received from the outside and determining whether there is an event and associated rules required for a dialog from the collected information, a rule determiner 113 for determining whether the currently collected information meets conditions of a rule included in the event, and a rule creator 114 for creating a topic (a determined rule) of the dialog by adding the collected information to the rule with a matching condition, and a rule determination manager 111 for controlling the aforementioned configurations.

The monitoring device 112 observes information required to start a dialog through various channels, e.g., content or circumstantial information sent by the communication device 150, a consequence derived from the dialog with the user sent by the result processor 130 of the dialog processing system 100, and the user's voice sent by the voice input device 210 including a sensor provided in the vehicle 200.

The content refers to various digital information provided over a communication network of the dialog processing system 100, including a wide range of information, such as works that provide education or entertainment information, worthy information or experiences.

The circumstantial information refers to information sent by the vehicle 200 in a specialized environment, such as, environment of the vehicle 200 including the dialog processing system 100, and includes driver condition information regarding a state of the driver, information related to machines included in the vehicle 200, and other various information.

The content delivered by the result processor 130 refers to the feedback derived from the previous dialog between the dialog processing system 100 and the user, including user information derived from the dialog with the user.

The monitoring device 112 may include an event determiner 112a and a rule presence determiner 112b for observing the aforementioned various information.

The event determiner 112a classifies the observed information into a category. In this regard, a category corresponds to an event. For example, a content that a new song of your favored singer was released may be classified into an event of 'recommendation of music'. Furthermore, if information related to a bus crash that occurred 10 Km ahead is collected, the event determiner 112a may classify the information into an event of 'providing crash information'. If a bus is running in front of the vehicle 200 and a command to change the air conditioner (AC) mode to closed air mode is spoken and input by the user, the event determiner 112a may classify it into an event of 'creation of rule'.

Once the observed information is classified into an event, the rule presence determiner 112b checks whether there is a rule included in the event classified. The rule is preset and stored in a rule storage database (DB) 141. The rule presence determiner 112b determines whether a rule belonging to the event exists in the rule storage DB 141.

Once the monitoring device 112 determines that an event and a rule included in the event exist in the observed information, the rule determiner 113 determines whether information observed from the event and the various rules included in the event meet a condition of the rule.

As described above, the rule includes a condition and a consequence, and the rule determiner 113 determines whether the condition is met by applying the information to the condition.

For example, the rule determiner 113 compares the collected information and one of rules included in the event of "recommendation of music" to recommend and play a song if a singer A has newly released the song. If the collected information is a new song of the singer A, the collected information meets the condition of the rule and the consequence of the rule (recommendation and playing of the song) becomes the topic of a dialog.

The rule determiner 113 stores the rule with the condition with which the collected information satisfies in the storage 140.

The storage 140 may be divided into a temporary memory 142 and a permanent memory 143. The permanent memory 143 may store information which may be permanently used, such as the user's phone book, schedules, preferences, academic background, personality, occupation, information regarding his or her family, etc. The temporary memory 142 may store information which may be used temporarily because the permanence of the information is not guaranteed, such as the current/previous location, today's schedule, previous dialog content, dialog participant, surrounding situation, domain, the driver's state, etc. Depending on the type, there may be data stored simultaneously in two or more of the rule storage DB 141, the temporary memory 142, and the permanent memory 143.

Turning back to FIG. 8, the rule determiner 113 stores information that meets the condition of a rule in the temporary memory or the permanent memory 143 according to e.g., an event, and sends the determined rule to the rule creator 114.

The rule creator 114 generates the rule whose condition is met as a determined rule and stores it in the rule determination storage DB 144.

The term 'determined rule' as herein used refers to data combining the consequence of the rule with the condition met and the observed information, and corresponds to the topic of a dialog that the dialog processing system 100 first talks to the user. The dialog processing system 100 generates data to start a dialog with the user from various information collected, and based on this, starts the dialog with the user.

In the meantime, the rule creator 114 may not only generate the determined rule based on the observed subject but also generate various rules to be stored in the rule storage DB 141.

For example, the rule creator 114 may extract a condition and a consequence from a result of the dialog with the user or from the information input by the user's voice, and generate various personalized rules.

How the rule determiner 110 generates the topic of a dialog to be started first was described in the following description, when the dialog processing system 100 starts the topic of the various dialogs will be focused.

Figure 9:
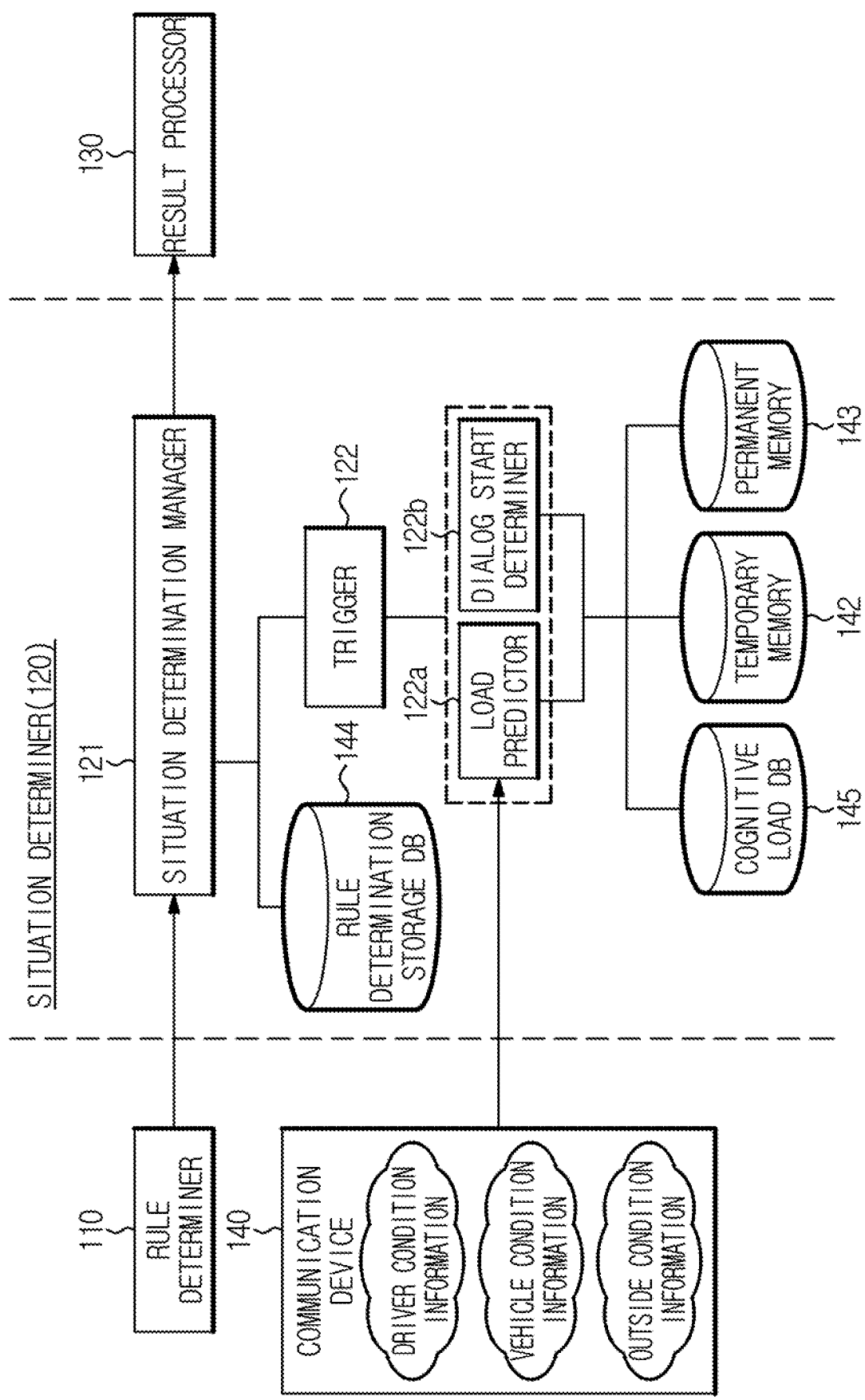
FIG. 9 is a control block diagram of a dialog processing system, in which the configuration of a situation determiner is specified.

FIG. 9 is a control block diagram of a dialog processing system, in which the configuration of a situation determiner is specified.

Referring to FIG. 9, the situation determiner 120 may include a situation determination manager 121 for managing the rule determination storage DB 144 that stores the determined rules generated by the rule determiner 110, and controlling overall operation of the trigger 122 and the situation determiner 120 that determine a point in time to start the dialog based on the collected circumstantial information.

As described above, the determined rules generated by the rule determiner 110 are stacked in the rule determination storage DB 144 in the creation order. In other words, the determined rules generated based on the previously collected information and rules are accumulated chronologically in the rule determination storage DB 144.

The situation determination manager 121 determines priorities of the accumulated determined rules and finally determines whether to start a dialog.

The trigger 122 to determine a point in time to start a dialog may be divided into a load predictor 122a for determining a cognitive load value for the user to recognize the start of the dialog of the dialog processing system 100, and a dialog start determiner 122b for determining a final point in time to start a dialog based on the cognitive load value.

The cognitive load value refers to an extent to which the user is configured to recognize a dialog started by the dialog processing system 100, and is determined from various circumstantial information collected from the outside.

The cognitive load value may be determined from a predictive model based on at least one of driver condition information, vehicle condition information, and outside condition information.

The driver condition information may include the driver's basic information, e.g., the driver's sex, age, and driving record, and may be classified into the driver's mental state and preference. The driver's mental state and preference is identified from dialogs with the user, a state of being configured to the current road condition, risk tolerance of the driver, and relationships with fellow passengers.

The vehicle condition information may include the vehicle's basic information, e.g., information related to whether it is a commercial vehicle or a personal car, whether it is a vehicle or a van, and whether it is manual or automatic, and may be identified by vehicle driving information including the vehicle's current speed, a steering angle, traveling direction, front/side obstructions, whether the turn indicator is on or off.

The outside condition information refers to various information requested and collected by the dialog processing system 100 from the outside, including information collected from at least one of various sensors provided in the vehicle 150, the vehicle controller 240, the user's terminal, and an external network through the communication device 150. For example, the outside condition information includes various information, such as current temperature detected by a temperature sensor, map and location information delivered by the navigation, and information related to calls made by the user terminal.

The cognitive load value may be changed to various numerical values corresponding to the aforementioned various circumstantial information. For example, when the driver has turned on the ignition and started the vehicle 200, the driver may focus the situation so much that the cognitive load value may be small. On the other hand, when the vehicle 200 is currently driven on the highway that runs straight and expected to be driven on the road for a while, the driver may recognize a dialog started by the dialog processing system 100 and continue the dialog, so that the cognitive load value may be large. Accordingly, the cognitive load value may result from comprehensive determination of the driver's tendency, behavior, and mental state, and the condition of a road on which the vehicle 200 is driven, and may be determined by a predictive model stored in a cognitive load DB 145. The predictive model may employ various methods known to the public and may be updated by machine learning.

The determined rules stacked in the rule storage DB 144 include the respective reference cognitive load values that become the bases for starting a dialog. The load predictor 122a compares the current cognitive load value with the reference cognitive reference values of the accumulated determined rules, and selects a determined rule required for start a dialog. The load predictor 122a sets priorities of the determined rules.

A dialog start determiner 122b compares duration times of the determined rules with set priorities to find a duration time in which the current cognitive load value is maintained, and determines a point in time to start a dialog with the determined rule.

A dialog start determiner 122b compares duration times in which the current cognitive load value is maintained among duration times of the determined rules with set priorities, and then determines a point in time to start a dialog with the determined rules.

The trigger 122 sends the point in time to start a dialog determined by the dialog start determiner 122b and the determined rule to the result processor 130.

In the meantime, the trigger 122 may examine not only the starting point of the dialog but also how the cognitive load of the user is changing during the dialog from the start of the dialog, by accounting for an influence of the topic of the dialog to be started on the user's cognitive load.

The method of accounting for the cognitive load may be expressed in the following equation (1):

$$\text{if}((1+a)*X <= Th[i] \,\&\&\, D\_x >= D\_y[i]), \text{ then Triggering=True} \quad (1)$$

where X denotes a cognitive load value determined based on the predictive model, Th[i] denotes the reference cognitive load value included in the accumulated determined rule, and i denotes the order of being accumulated in the rule determination storage DB 144. D_x denotes duration time in which the determined cognitive load value is maintained, and D_y[i] denotes a time period required for the determined rule to be output as text. Triggering=True means that a triggering signal is generated when the condition of if clause is met.

Figure 10:
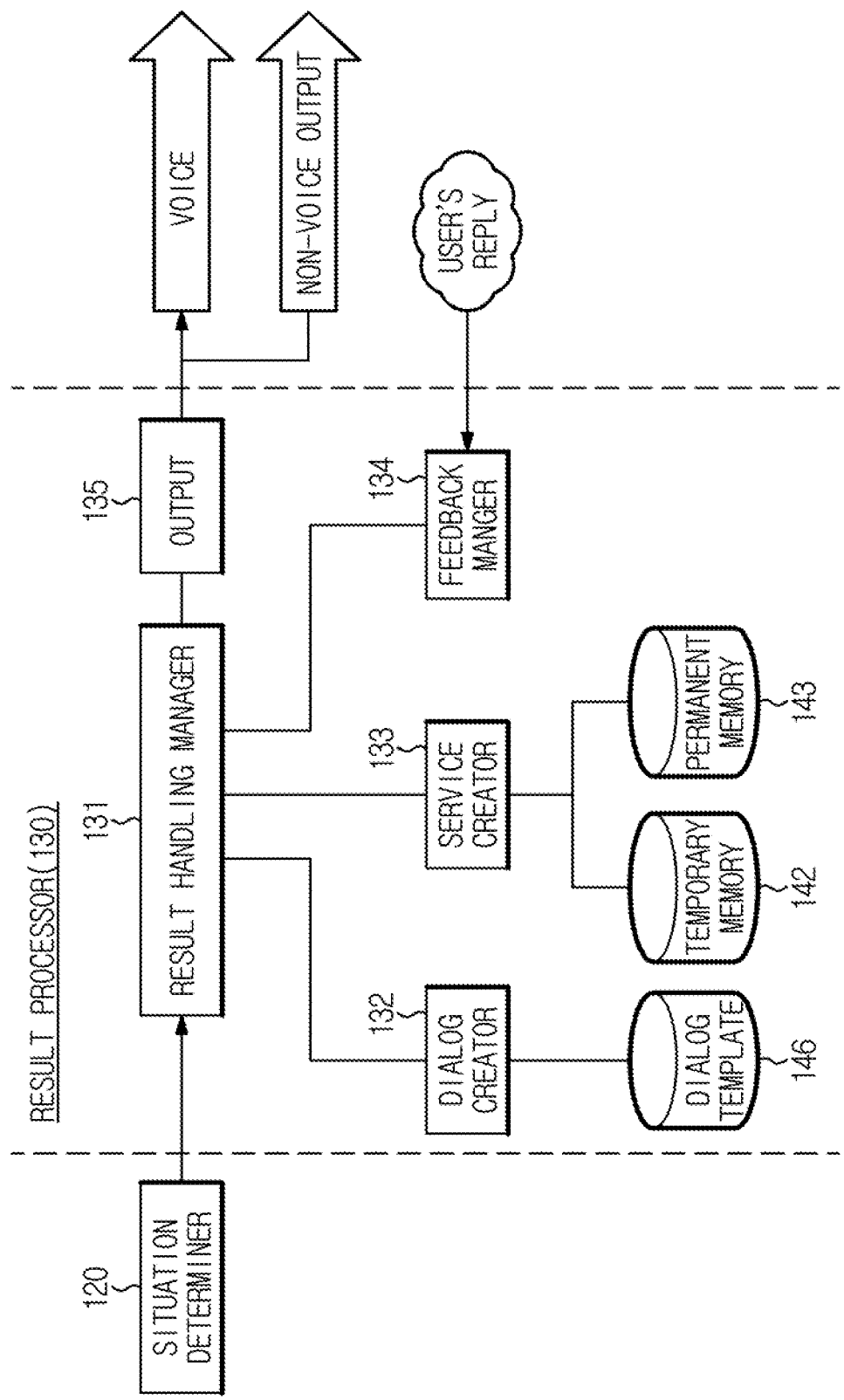
FIG. 10 is a control block diagram of a dialog processing system, in which the configuration of a result processor is specified.

FIG. 10 is a control block diagram of a dialog processing system, in which the configuration of a result processor is specified.

Referring to FIG. 10, a determined rule determined by the situation determiner 120 is sent to the result processor 130, converted and output into text or various forms of sound for the user.

The result processor 130 may include a dialog creator 132 for creating text for the dialog to be started based on the determined rule sent from the situation determiner 120, a service creator 133 for creating various services related to the event, a feedback manager 134 for starting a dialog, feeding back and processing the user's reply, and a result handling manager 131 for controlling the operation of the enumerated components.

The result processor 130 may include an output 135 connected to a speaker required for starting a dialog and a hardware component for outputting non-voice to deliver a control command, and the output 135 operates under the control of the result handling manager 131.

The dialog creator 132 generates a text to speech (TTS) signal based on the determined rule. The TTS is generated based on a dialog policy stored in a dialog template 146.

The dialog creator 132 makes comprehensive examination on the event defined by the determined rule and a consequence of the determined rule, and selects a dialog policy accordingly. The dialog policy may include text having the subject, verb, etc., which are essential for a dialog sentence.

The dialog creator 132 generates a complete sentence by inserting a factor included in the determined rule to the text.

The factor included in the determined rule is information inserted when the rule determiner 110 makes a rule, and includes various data derived from at least one of information collected from the outside, circumstantial information, and a result satisfying the condition.

For example, if the dialog creator 132 selects "Your favored singer, released a new song" with a dialog template, the singer A is included in the determined rule sent by the situation determiner 120 and the name 'singer A' becomes data and is used as a factor.

Although the above description of the dialog creator 132 is focused on starting a dialog and thus the TTS as an example, embodiments of the present invention is not limited to the TTS but may include creation of various signals required for starting a dialog, such as audio signals.

The service creator 133 generates a signal of a service to be performed by the dialog processing system 100 based on various signals generated by the dialog creator 132.

For example, if the dialog creator 132 generates a dialog about recommendation of a new song of the singer A, the service creator 133 may generate an image including a picture of the singer A or a label of the new song.

The service creator 133 may extract data required for signal creation from the temporary memory 142 or the permanent memory 143 and use the data in creating the service signal.

The feedback manager 134 receives a voice output as a reply of the user to a word output by the output 135 or a signal input through other device. The feedback manger 134 may analyze the user's reply received and reflect the result in the next dialog policy, or modify or change what is pointed by the user.

Furthermore, the feedback manager 134 may collect a sequential procedure in which the user makes a reply to a content of the dialog started by the dialog processing system 100 and the dialog processing system 100 makes a reply to the user's reply, and reflect the procedure in the dialog policy.

The feedback manger 134 may also be requested to generate a rule, which becomes a basis for the dialog processing system 100 to select a topic of the dialog, and may generate a new rule including a new condition and its consequence at the request of the user. This will be described later in more detail with reference to FIG. 21.

The control block diagrams of the dialog processing system 100 are not limited to what are shown in FIGS. 8 to 10, and at least one component may be omitted or added according to the performance of the dialog processing system 100.

FIGS. 11 to 15 show a procedure of a dialog processing system starting the dialog shown in FIG. 3.

Figure 11:
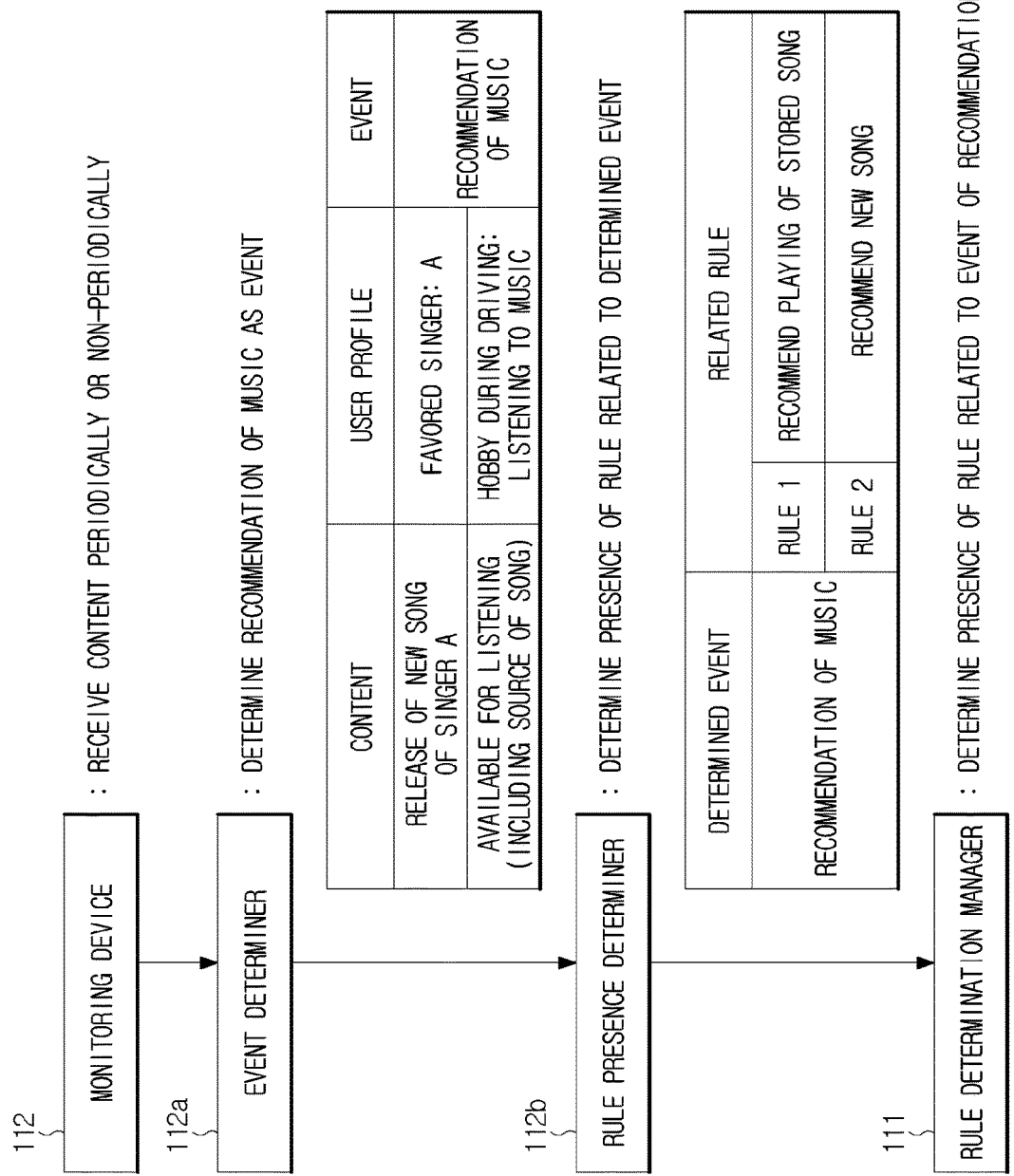
FIG. 11, FIG. 12, FIG. 13, FIG. 14 and FIG. 15 show a procedure of a dialog processing system starting the dialog shown in FIG. 3.

Referring first to FIG. 11, the monitoring device 112 periodically or non-periodically observes various information collected from the outside. In the exemplary embodiment of the present invention, the monitoring device 112 may receive the content sent by the communication device 150, i.e., information related to a release of the singer A's new song.

The monitoring device 112, in particular, the event determiner 112*a*, analyzes the received information and determines that the content includes the release of the A's new song and a source of the song. The event determiner 112*a* receives the user's profile stored in the permanent memory 143 and compares it with the received information.

In an exemplary embodiment of the present invention, the event determiner 112*a* determines that the content includes information related to the singer A and the user likes the singer A from the user's profile. Furthermore, the event determiner 112*a* may determine that the user likes to listen to music while driving and that listening to music is available because the content includes a music source. Accordingly, the event determiner 112*a* determines an event of recommendation of music from the currently received information.

Once the event is determined, the rule presence determiner 112*b* determines whether a rule associated with the event of recommendation of music exists. If there is no rule in the determined event, the rule presence determiner 112*b* discards the collected content and does not store any related information.

In various exemplary embodiments of the present invention, the rule presence determiner 112*b* may determine that rule 1 and rule 2 exist in the event of recommendation of music. For example, rule 1 may include a rule to recommend playing a stored song and a rule to recommend a new song.

Once it is determined that a rule exists, the rule determination manager 111 controls the rule determiner 113 to determine whether the collected information meets a condition of the rule.

Figure 12:
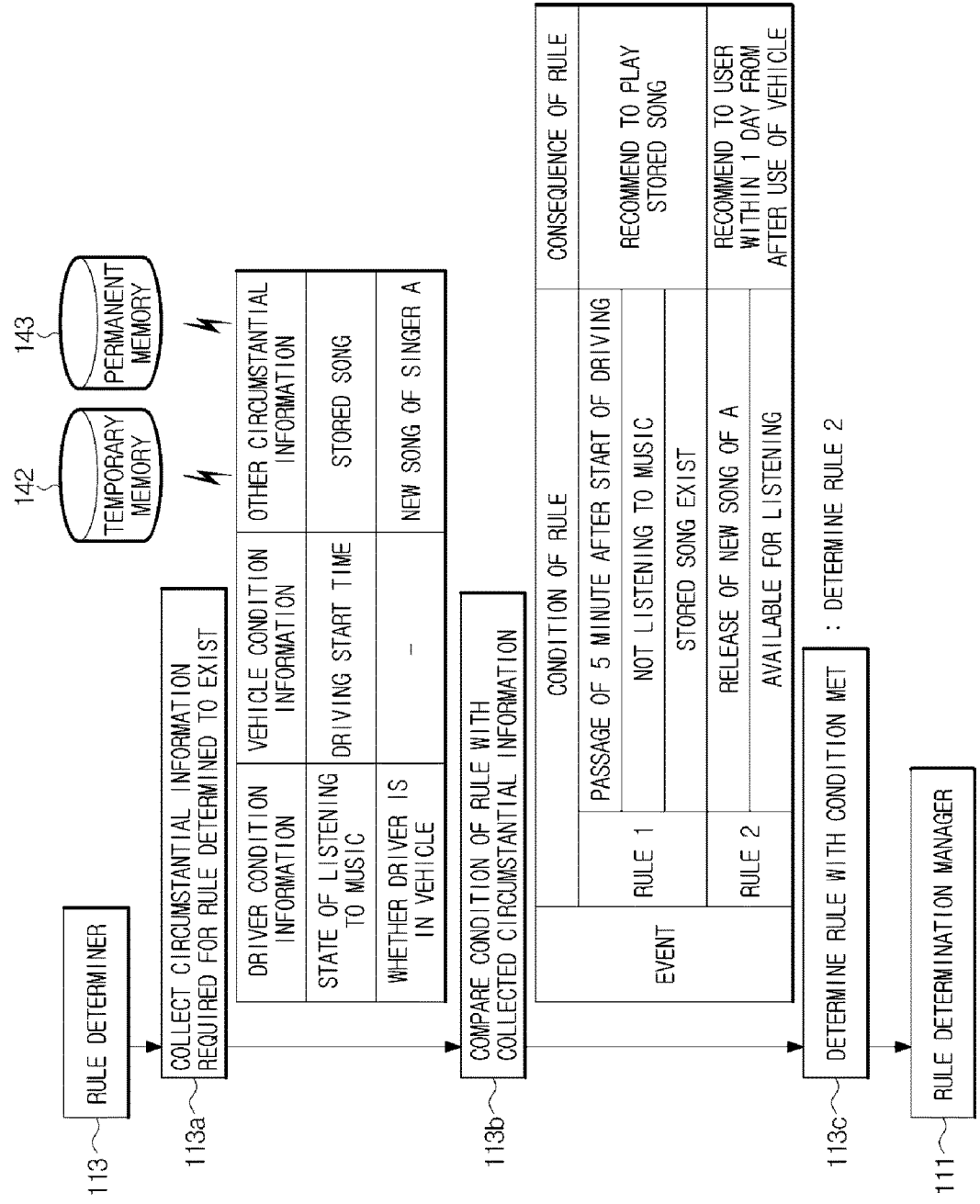

Referring to FIG. 12, the rule determiner 113 collects circumstantial information required for the rule which is determined to exist, in 113a. Since the collected information is limited, it is not sufficient to determine one of the rules included in the event.

Accordingly, the rule determiner 113 collects circumstantial information required to determine the condition of the rule that exists in the determined event from the temporary memory 142 and the permanent memory 143.

In an exemplary embodiment of the present invention, the rule determiner 113 collects circumstantial information related to whether the user is now listening to music, information related to a driving start time, and circumstantial information related to whether there is a song stored, in relation to the rule 1.

The rule determiner 113 also collects circumstantial information related to whether the driver rides in the vehicle 200 in relation to the rule 2. The information related to whether it is the singer A's new song may be omitted because it is included in the received content.

In relation to whether the user rides in the vehicle, if the user does not ride in the vehicle 200, the dialog processing system 100 may include various rules, such as sending the information related to whether the new song of the singer A has been released to the user terminal through the communication device 150, starting a dialog about listening to new song, etc. What is shown in FIG. 12 is merely an example, and the rule is not limited to those shown in FIG. 2.

Turning back to FIG. 12, the rule determiner 113 determines whether a condition of each rule is met based on the collected information.

For example, a condition of the rule 1 includes passage of 5 minutes after the start of driving, the user not currently listening to music, and existence of a song in a storage. If the condition of the rule 1 is met, playing the song stored may be recommended as a consequence of the rule.

A condition of the rule 2 includes a release of a new song of the singer A and an available situation for listening to the song (i.e., existence of a source of the song). If the condition of the rule 2 is met, listening to the song may be recommended for the user within 1 day from after the use of the vehicle.

The rule determiner 113 determines that the condition of the rule 2 is met based on the information included in the collected circumstantial information and contents, and determines the rule 2 to be a rule corresponding to the current content.

Figure 13:
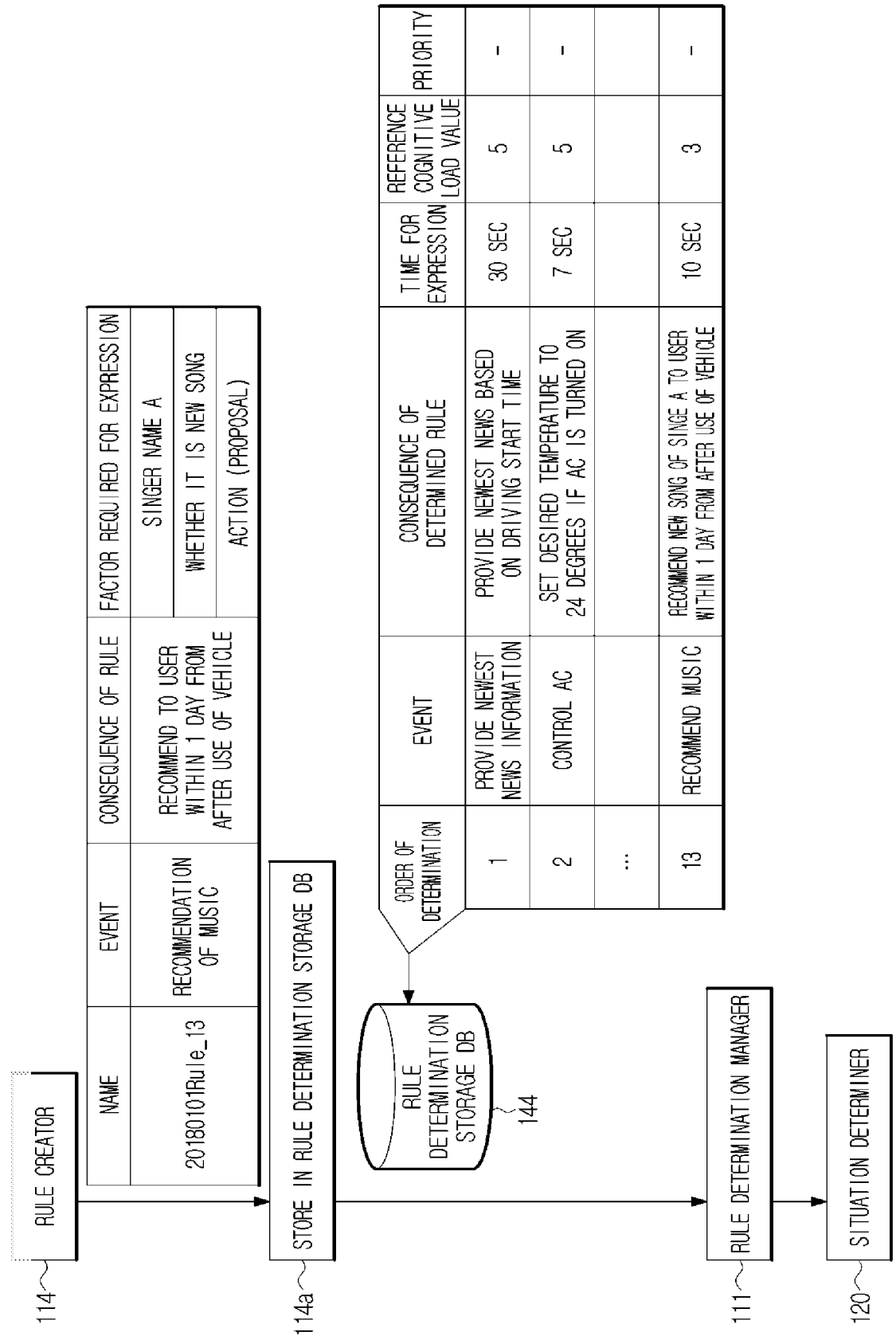

Referring to FIG. 13, a determined rule is generated by adding a factor required for the dialog to be started based on the rule 2 and the collected data.

For example, the rule 2 may be generated as a determined rule titled '20180101Rule_13', and the determined rule may include a type of the event (event recommendation), consequence of the rule (recommending the new song of the singer A for the user within 1 day from the use of the vehicle), and a factor required for starting the dialog.

The content included in the determined rule is not limited to what is shown in FIG. 13, but includes various factors required for triggering, as will be described later, such as time required for starting the dialog, the reference cognitive load value, and the like.

The rule creator 114 stores the determined rule generated in the rule determination storage DB 144, in 114a.

The rule determination storage DB 144 has determined rules generated by the rule creator 114 stacked in sequence. For example, the rule determination storage DB 144 stores determined rules generated previously, including providing the newest news information, controlling the AC, etc.

Each of the determined rules includes an event included at the time of creating the determined rule, a consequence of the determined rule, and a factor required for starting the dialog. Furthermore, the determined rule may include time expected to be taken to generate a dialog according to the consequence of the rule and the minimum cognitive load value required for triggering as a factor, which may be set before the rule is generated.

A determined rule about recommendation of music, which is generated in accordance with an exemplary embodiment of the present invention, may be inserted to the rule determination storage DB 144 for the thirteenth time, and the rule creator 114 may insert the expected time taken to start the dialog and the reference cognitive load value together as shown in FIG. 13.

The operation of the rule determiner 110 creating a determined rule and storing the determined rule in the rule determination storage DB 144 may be performed separately from the operation of the situation determiner 120. In other words, the operation of creating a determined rule from a collected content and the operation of the situation determiner 120 starting a dialog at a proper time may not be necessarily performed in sequence.

Figure 14:
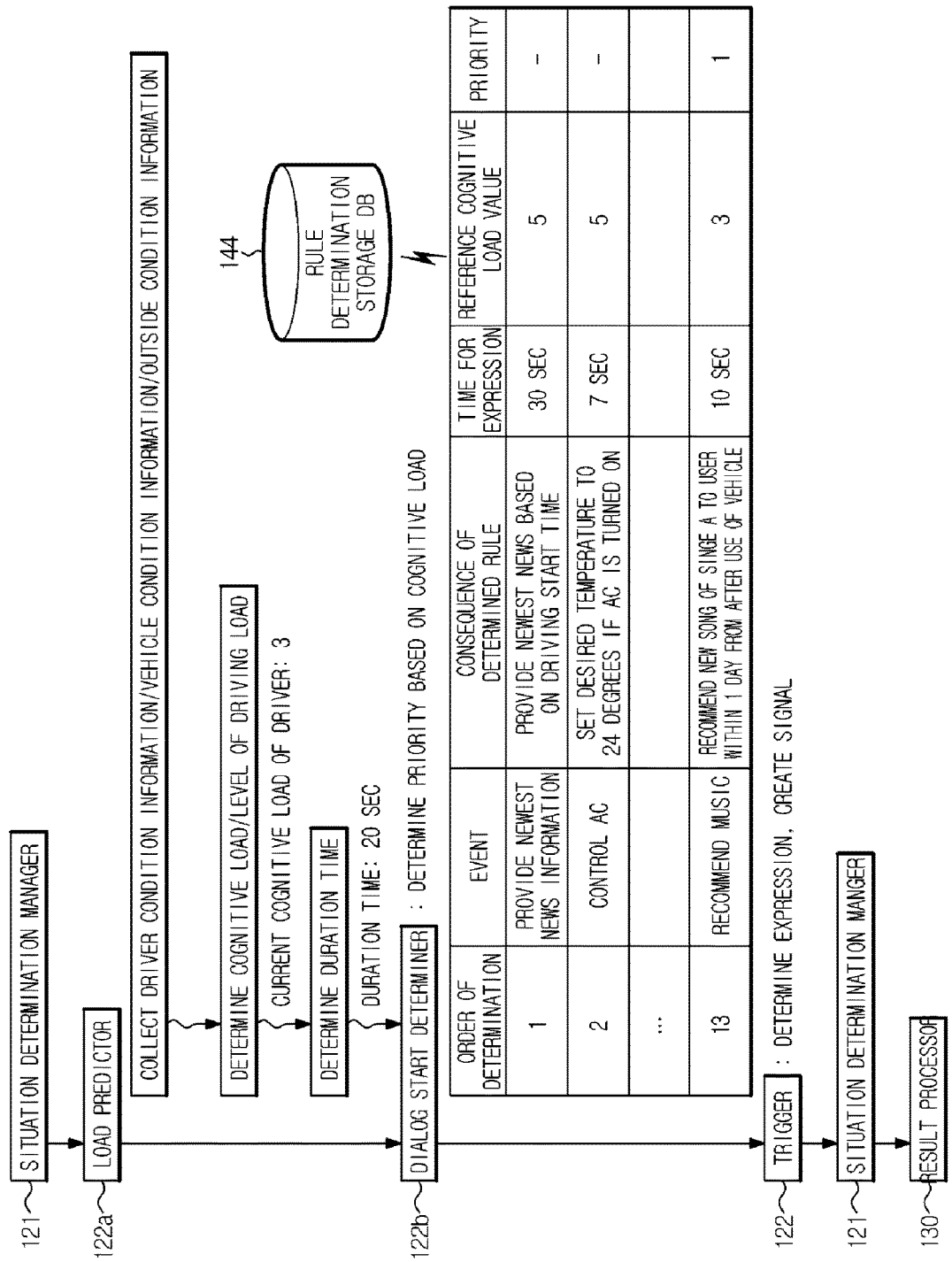

Referring to FIG. 14, the load predictor 122a recalculates a cognitive load value by collecting the driver condition information, the vehicle condition information, and the outside condition information regardless of the collected content.

In an exemplary embodiment of the present invention, the load predictor 122a may determine that the current cognitive load value for the user is '3' and the duration time for which the determined cognitive load value is maintained is 20 seconds from the circumstantial information.

The dialog start determiner 122b determines a priority included in the rule determination storage DB 144 based on the determined cognitive load.

The dialog start determiner 122b compares the reference cognitive load value included in the determined rule with the user's cognitive load value and determines priorities for determined rules having cognitive load values exceeding the reference cognitive value.

For example, since the current cognitive load value is '3' and the determined rules 1 and 2 stored in the rule determination storage DB 144 have reference cognitive load values not less than '3', priorities of the rules are not set.

Since ten seconds of the time to express the dialog with the determined rule about recommendation of music is less than the duration time of 20 seconds, the dialog start determiner 122b sets the determined rule about recommendation of music as a top priority.

Unlike what is shown in FIG. 14, a plurality of determined rules stored in the rule determination storage DB 144 may satisfy the current cognitive load value. In the instant case, the trigger 122 may take priorities for the determined rules based on a predetermined reference. For example, with the dialog processing system 100 provided in the vehicle 200, a determined rule required for safe driving, such as giving accident information or changing directions may be set to have a higher priority than other determined rules. This will be described in detail later in connection with FIG. 19.

Once a determined rule to start a dialog is determined according to the priority, the trigger 122 sends a trigger signal to start the dialog to the result processor 130.

Figure 15:
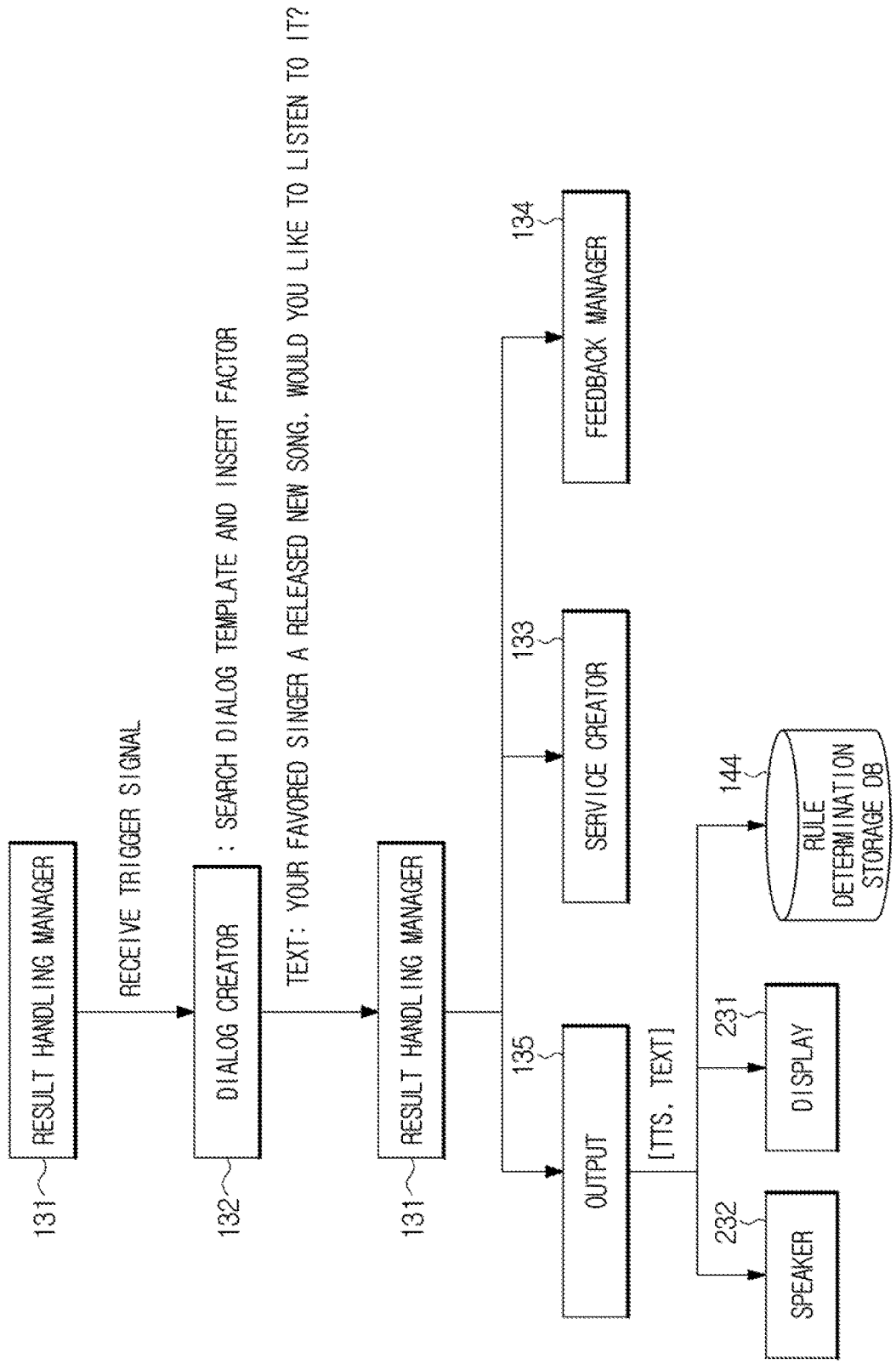

Referring to FIG. 15, the result processor 130 may receive the trigger signal and generate text to be expressed using the determined rule set to take the highest priority in the rule determination storage DB 144.

In an exemplary embodiment of the present invention, the dialog creator 132 selects text related to the determined rule about recommendation of music, which is selected to take the first priority, and the event from the dialog template 146. If "One of your favorite singer _____ has released a new song. Would you like to listen to it?" is selected, the dialog creator 132 may complete a sentence by extracting a factor of the singer an included in the determined rule and inserting the factor to the dialog.

The dialog creator 132 may send the complete sentence to the result handling manager 131, which may in turn control the output 135 to express the sentence through the speaker 232 and display the sentence through the display 231.

In an exemplary embodiment of the present invention, the result handling manager 131 may verify a source of the song in the determined result and control the service creator 133 to prepare to play the song from the source. If the feedback manager 134 receives a reply from the user, e.g., "Oh, really? Play it for me", the result handling manager 131 may play the new song of the singer A through the service creator 133.

FIGS. 16 to 20 show a procedure of a dialog processing system starting the verbal dialog shown in FIG. 4. Overlapping description with what are described in FIGS. 11 and 15 will not be repeated.

Figure 16:
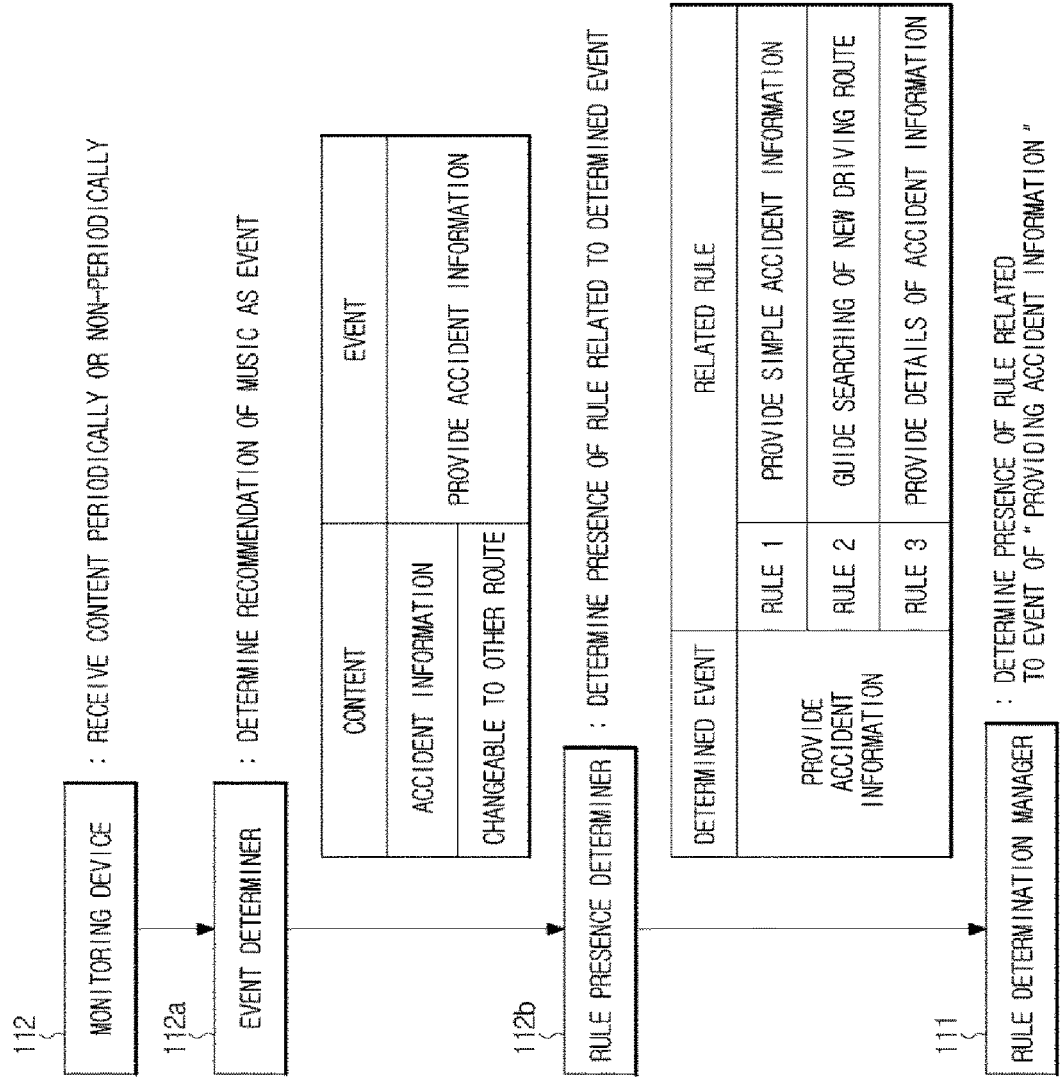
FIG. 16, FIG. 17, FIG. 18, FIG. 19, and FIG. 20 show a procedure of a dialog processing system starting the dialog shown in FIG. 4.

Referring to FIG. 16, the monitoring device 112 may collect contents or circumstantial information related to occurrence of an accident 10 Km ahead. The collected information may include information related to a detour route to avoid the accident along with the accident information including a range of the accident, a spot of the accident, the severity of the accident.

The event determiner 112a may determine providing the accident information as an event based on the collected information.

The rule presence determiner 112b may search the rule storage DB 141 to determine whether associated rules 1, 2, and 3 exist in the event about providing the accident information.

The rule determination manager 111 sends the event determined to have rules to the rule determiner 113.

Figure 17:
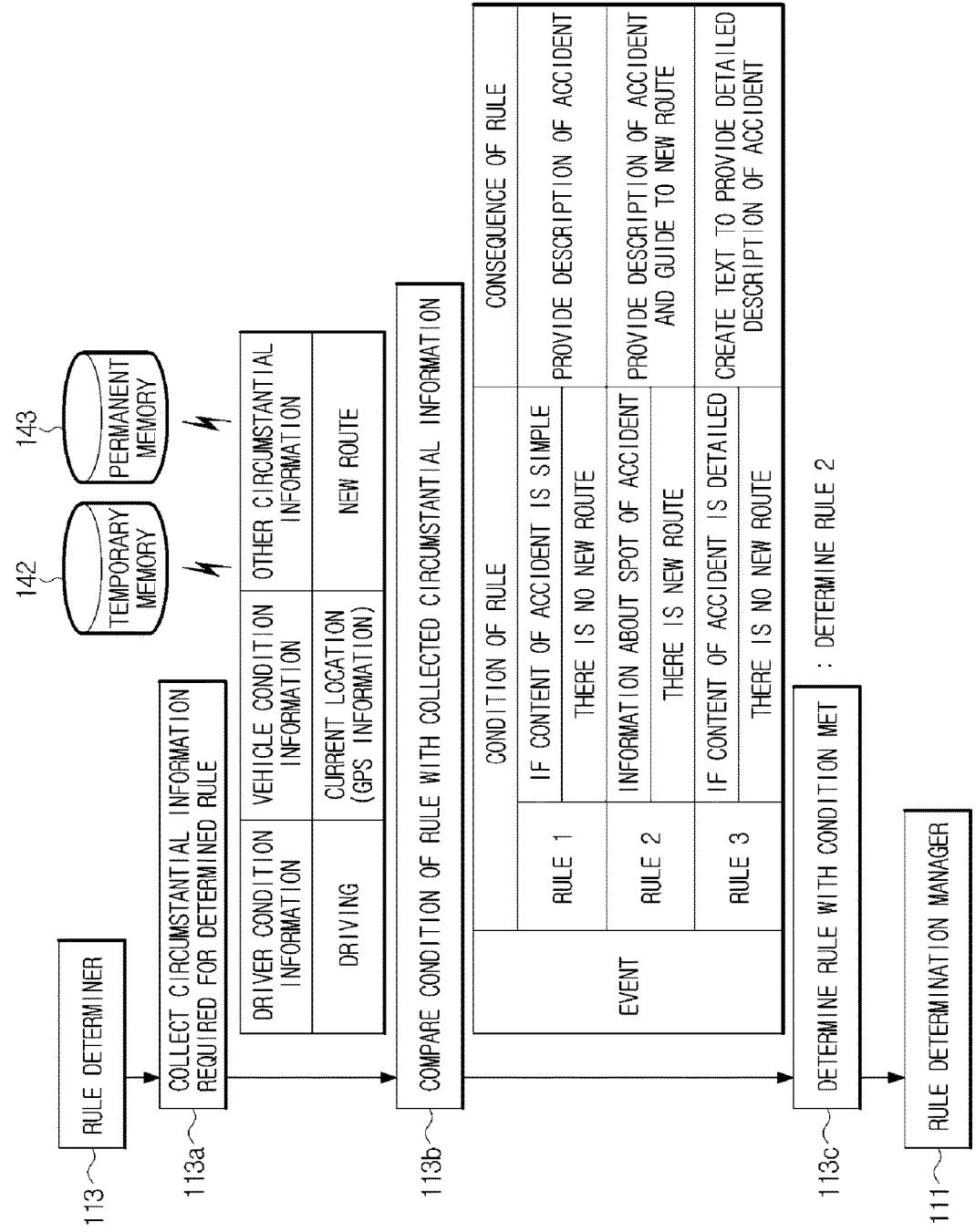
Figure 18:
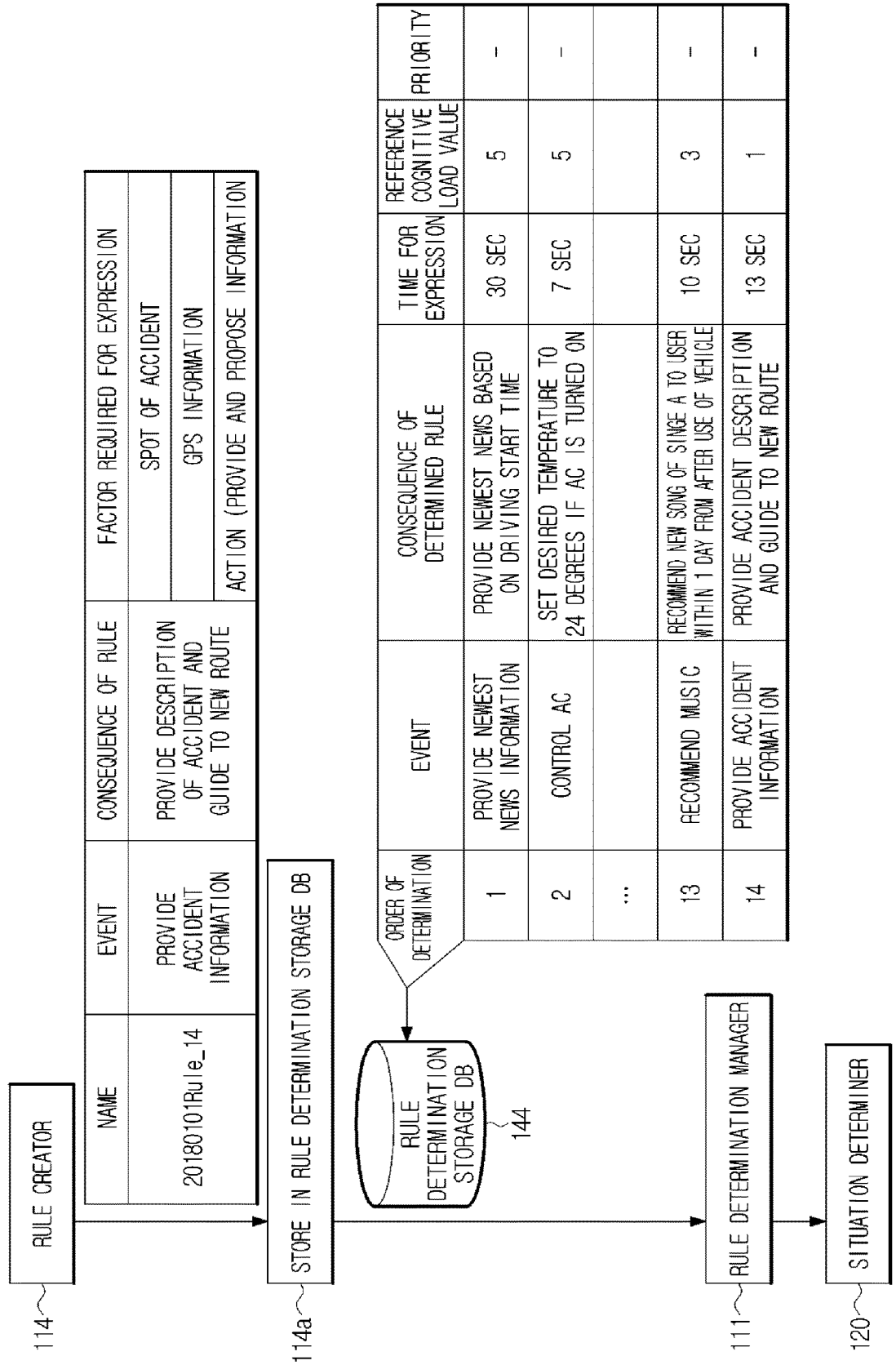

Referring to FIG. 17, the rule determiner 113 may collect circumstantial information required to determine conditions of the rules 1 to 3. In an exemplary embodiment of the present invention, the rule determiner 113 collects various circumstantial information related to the fact that the current user is the driver, the current GPS location, and a new route from the temporary memory 142 and the permanent memory 143.

The rule determiner 113 may determine whether conditions of the rules 1 to 3 are met based on the collected circumstantial information and information required for the content.

For example, the rule 1 has a consequence of the rule to deliver a simple description of the accident and a condition to be met if the description of the accident is simple and there is no new route. The rule 2 may have a condition to be met if information related to a spot of the accident is included and there is a new route, and in the instant case, have a consequence of the rule to deliver the description of the accident and give directions to the new route. The rule 3 may have a consequence of the rule to deliver a detailed description of an accident and a condition to be met if there is detailed information differently categorized, such as information related to the spot of the accident, the severity of the accident, and accident time and if there is no new route.

If the collected content includes a new route, the rule determiner 113 determines that it satisfies the condition of the rule 2 and thus determines the rule 2 as a determined rule.

The rule creator 114 generates the determined rule titled '20180101Rule14'. The determined rule may include some factors extracted from the collected information, e.g., the spot of the accident, the GPS information, etc. Furthermore, the rule creator 114 generates the determined rule by including the time taken to start the dialog and the reference cognitive load value that the determined event and the rule 2 have.

The rule creator 114 stores a determined rule generated to provide the accident information in the rule determination storage DB 144. An example of what is stored next to the determined rule about recommendation of music shown in FIG. 13 will now be described.

Figure 19:
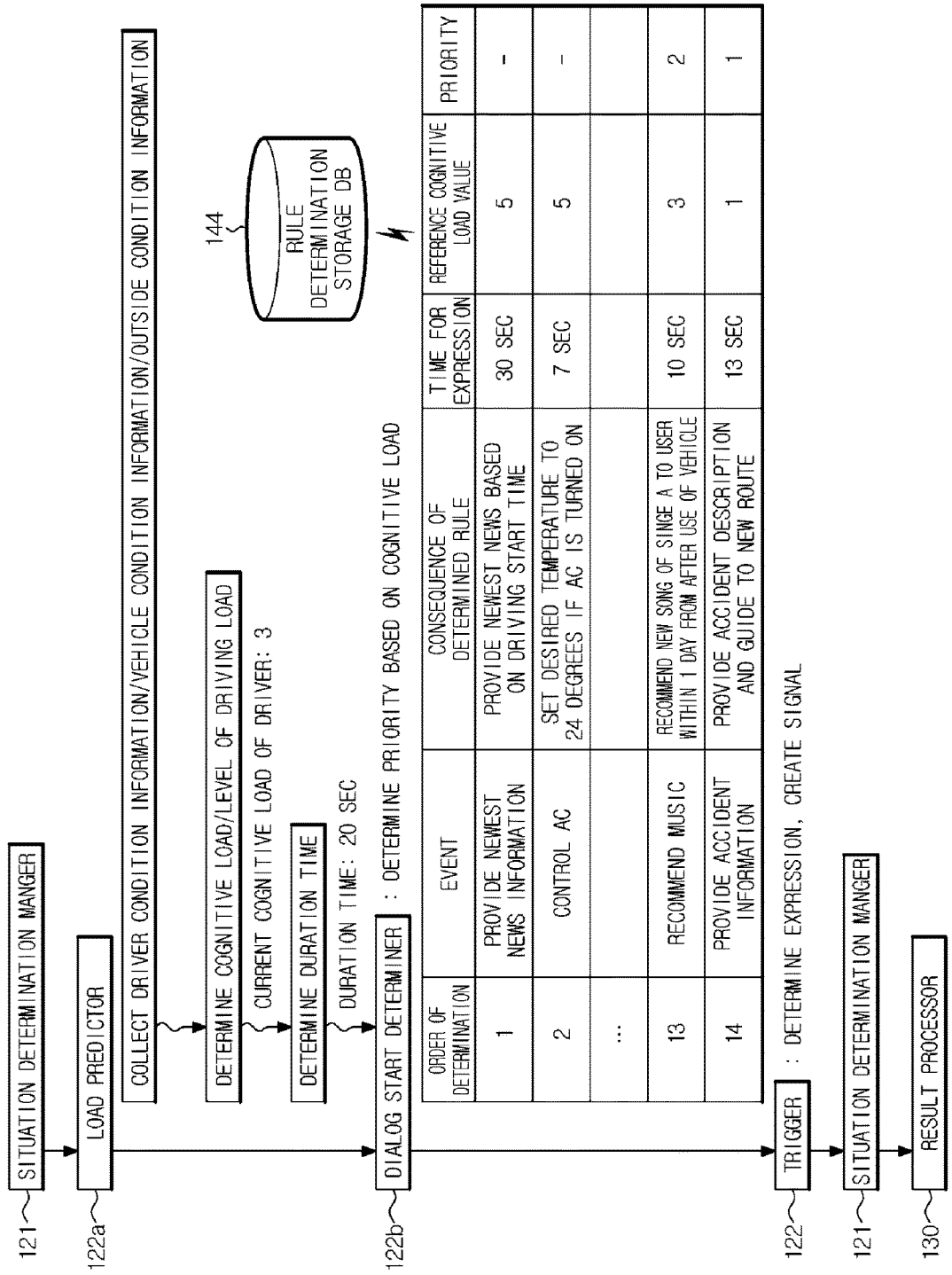

Referring to FIG. 19, the load predictor 122a may determine '3' for the current cognitive load value of the user and 20 seconds for the duration time based on the collected circumstantial information.

The dialog start determiner 122b may determine that the determined rule about recommendation of music and the determined rule about providing accident information are included in the user's cognitive load value and the duration time.

For example, the dialog start determiner 122b may set the determined rule about providing accident information with a small reference cognitive load value as the first priority. As described above, the cognitive load refers to an extent to which the user is configured to concentrate on the content expressed by the dialog processing system 100. Accordingly, the cognitive load may be understood as a priority required to be informed to the user, and providing the accident information is related to the driver's safety, in which case a determined rule related to providing accident information having a cognitive load value smaller than that of the rule about recommendation of music may be set as higher priority.

The priority may vary depending on the user's cognitive load determined by the load predictor 122a, and after the determined rule set as the first priority is expressed, the next prioritized determined rule may not be necessarily expressed next time.

The trigger 122 generates and sends a triggering signal to express the determined rule about providing accident information set as the first priority to the result processor 130.

Figure 20:
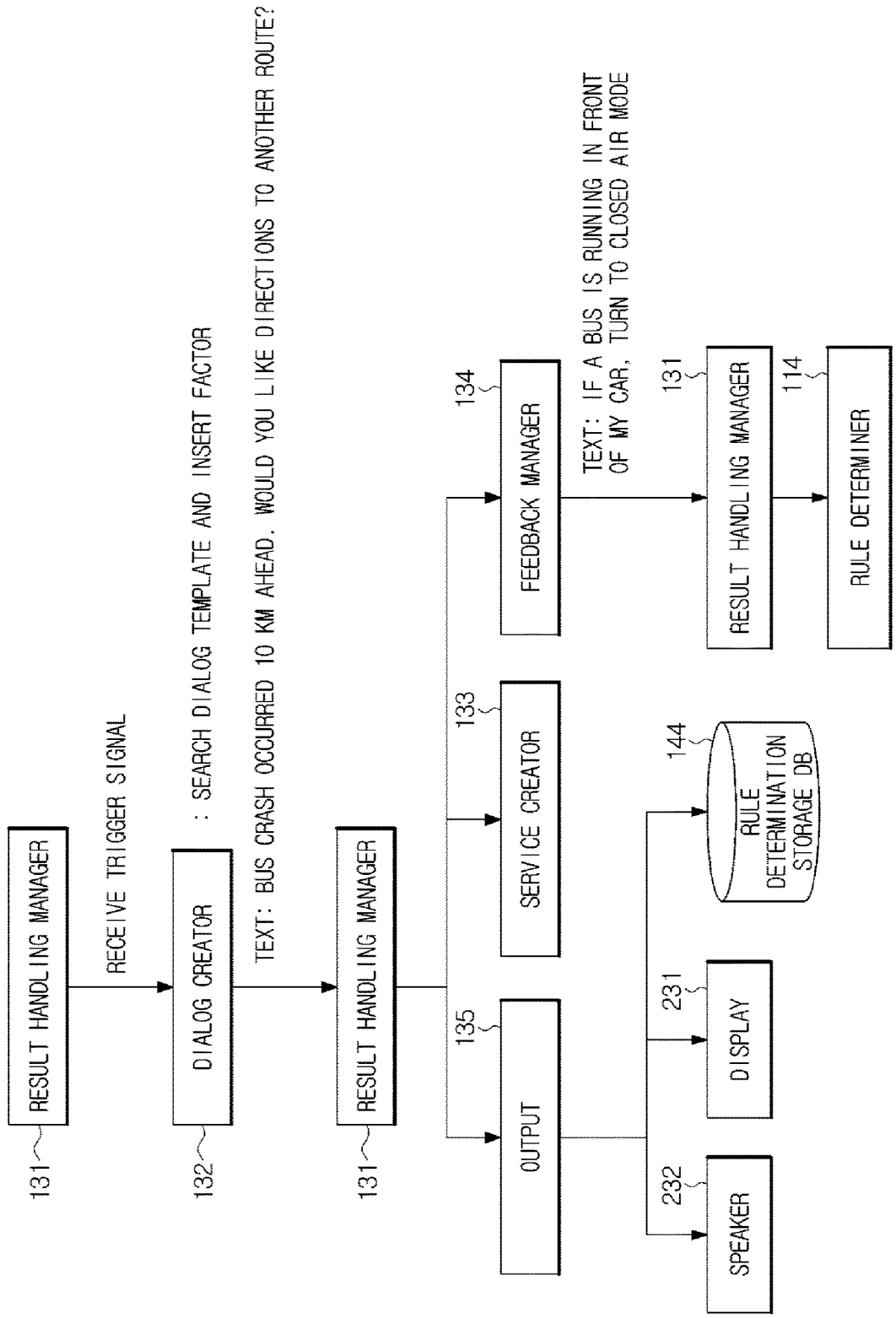

Referring to FIG. 20, the dialog creator 132 extracts the text "There is an accident ahead. Would you like directions to another route?" from the dialog template 146 based on the event and the determined rule.

The dialog creator 132 extracts a distance to the accident spot based on the factors included in the determined rule, e.g., the accident spot and the current GPS information. Furthermore, the dialog creator 132 extracts the content of the accident (e.g., a bus crash accident) from the factors and completes text by adding the factor to the text.

The result handling manager 131 controls the output 135 to output the complete text through the speaker 232 or the display 231.

Back in the exemplary embodiment of FIG. 4, the feedback manager 134 may receive a reply from the user, "if a bus is running in front of my car, turn to the 'closed air mode'.

The feedback manger 134 may apply a natural language understanding technology to the word expressed by the user to grasp the intention of the user. For example, the feedback manager 134 may interpret the reply of the user as creation of a rule, and perform an additional rule creation process, as will be described in connection with FIG. 21.

Figure 21:
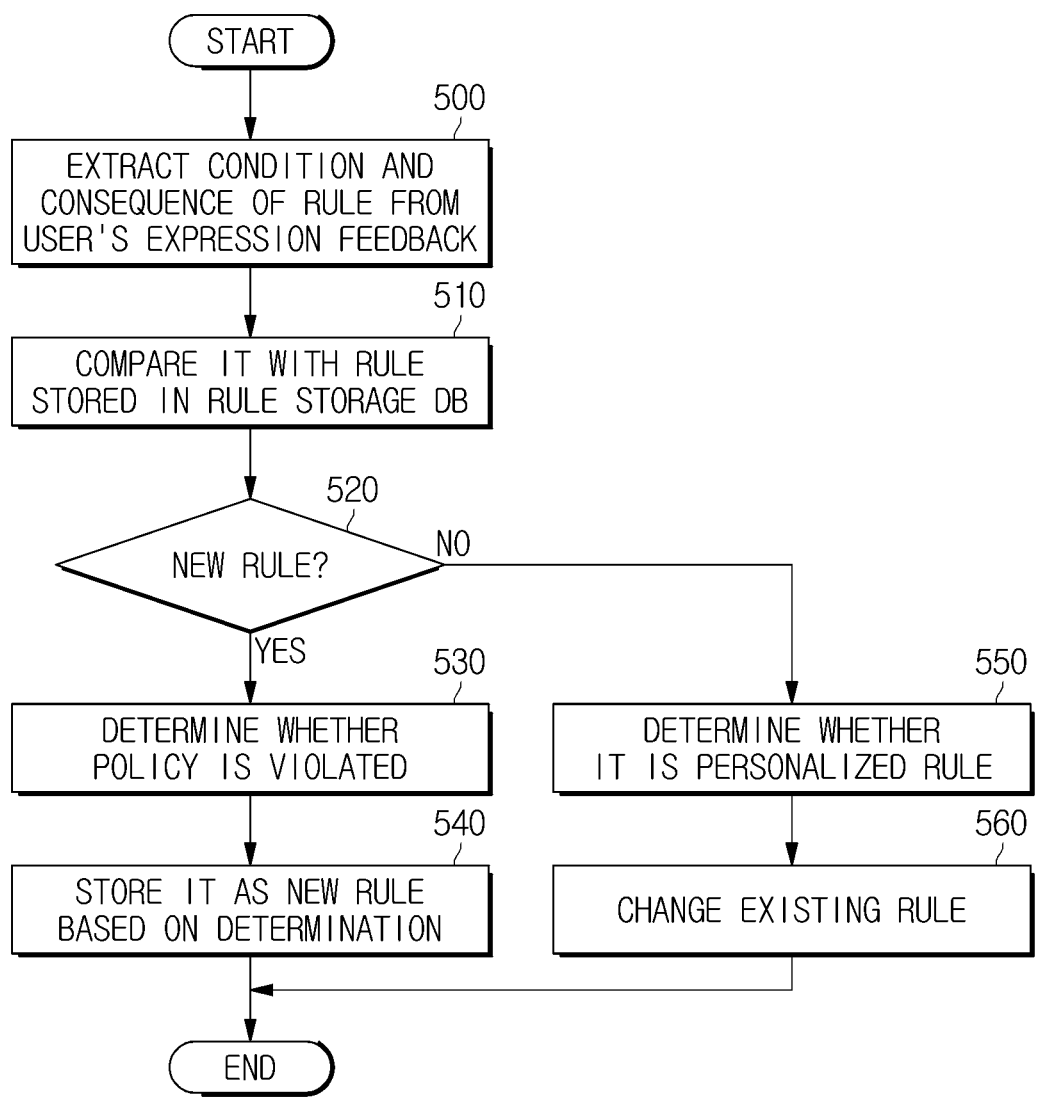
FIG. 21 is a flowchart illustrating a method for creating a rule by a dialog processing system, according to an exemplary embodiment of the present invention.

FIG. 21 is a flowchart illustrating a method for creating a rule by a dialog processing system, according to an exemplary embodiment of the present invention.

Referring to FIG. 21, the dialog processing system 100 extracts condition and consequence of a rule from what is expressed by the user, which is fed back, in 500.

For example, when a phrase "if a bus is running in front of my car" is extracted from what is expressed by the user, the 'if' clause may correspond to the condition.

Furthermore, the dialog processing system 100 may interpret the meaning of the 'closed air mode' of the expressed word of "turn to the closed air mode" and determine that it means controlling of the AC provided in the vehicle 200. In the instant case, the dialog processing system 100 may extract control of the AC as a consequence of the rule.

Once the condition of the rule is extracted, the dialog processing system 100 compares the extracted condition with conditions of existing rules stored in the rule storage DB 141, in 510.

If the extracted condition of the rule is a new one that does not match any condition of the existing rules, the dialog processing system 100 determines whether the extracted consequence of the rule violates the policy that the dialog processing system 100 pursues, in 530.

The policy that the dialog processing system 100 pursues is set in advance according to an environment in which the dialog processing system 100 is applied, and refers to a criterion that excludes what only includes the condition and consequence.

If the policy is not violated, the dialog processing system 100 stores the extracted rule in the rule storage DB 141 as a new rule, in 540.

On the other hand, if the extracted condition of the rule matches a condition of an existing rule, the dialog processing system 100 determines whether the extracted rule is a personalized rule, in 550.

The term 'personalized rule' as herein used commonly refers to a rule to start a dialog with a rule that the main user of the dialog processing system 100 wants to carry out according to his or her preference.

For example, if a rule of "set the desired temperature to 24 degrees when the AC is turned on" is extracted, this rule corresponds to a personalized rule on which the personal preference or state is reflected.

If the extracted rule is a personalized rule rather than the existing rule, the dialog processing system 100 selects this rule first in 560. The existing rule is changed to an extracted rule.

The exemplary embodiments of the present invention have thus far been described with reference to accompanying drawings. It will be obvious to people of ordinary skill in the art that the present invention may be practiced in other forms than the exemplary embodiments as described above without changing the technical idea or essential features of the present invention. The above embodiments are only by way of example, and may not be interpreted in a limited sense.

Meanwhile, the exemplary embodiments of the present invention may be implemented in a form of recording media for storing instructions to be conducted by a computer. The instructions may be stored in a form of program codes, and when executed by a processor, may generate program modules to perform operation in the exemplary embodiments of the present invention. The recording media may correspond to computer-readable recording media.

The computer-readable recording medium includes any type of recording medium having data stored thereon which may be thereafter read by a computer. For example, it may be a ROM, a RAM, a magnetic tape, a magnetic disk, a flash memory, an optical data storage device, etc.

According to exemplary embodiments of the present invention, a dialog processing system, vehicle having the same, and dialog processing method may prompt a dialog that suits a situation to give the user satisfaction.

According to exemplary embodiments of the present invention, a dialog processing system, vehicle having the same, and dialog processing method may provide information at a proper time to serve the user conveniently.

According to exemplary embodiments of the present invention, a dialog processing system, vehicle having the same, and dialog processing method may generate various rules depending on the feedback of the user, providing a best service for the user's actual intention or a service needed the most for the user.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dialog processing system comprising:
a communication device configured to receive information sent from the outside thereof and circumstantial information;
a storage configured to store a rule and a dialog template related to the rule;
a rule determiner configured to compare a condition of the rule and the information to generate a determined rule;
a situation determiner configured to determine to express the determined rule based on the determined rule and the circumstantial information collected from the outside; and
a result processor configured to generate text to be expressed based on the determined rule and the dialog template and output the text according to a signal sent from the situation determiner,
wherein the situation determiner is configured to determine a cognitive load value of a user based on the circumstantial information,
wherein the situation determiner is configured to determine a point in time to start a dialog based on the cognitive load value and a reference cognitive load value,
wherein the cognitive load value refers to an extent to which the user recognizes the text output from the result processor,
wherein the reference cognitive load value is included in the determined rule,
wherein the rule determiner is configured to determine the rule as the determined rule when a condition included in the rule corresponds to the information, wherein the situation determiner is configured to send the signal to the result processor according to priorities of a plurality of determined rules stored in the storage to start the dialog, wherein the situation determiner is configured to determine a duration time based on the circumstantial information, and wherein the situation determiner is configured to set a priority on each of the plurality of determined rules stored by comparing the determined cognitive load value and the reference cognitive load value included in the determined rule.

2. The dialog processing system of claim 1, wherein the rule determiner is configured to insert the information to the determined rule and store a resultant determined rule in the storage.

3. The dialog processing system of claim 1, wherein the situation determiner is configured to set the priority on each of the plurality of determined rules stored by comparing an utterance time included in the determined rule and the duration time.

4. The dialog processing system of claim 1, wherein the rule determiner is configured to select one event of events stored in the storage based on the information.

5. The dialog processing system of claim 4, wherein the rule determiner is configured to determine whether there is a plurality of rules associated with the one event.

6. The dialog processing system of claim 5, wherein the rule determiner is configured to determine one of the plurality of rules associated with the one event as the determined rule when the rule has a condition corresponding to the information.

7. The dialog processing system of claim 1, wherein the result processor is configured to determine information included in the determined rule as a factor to be inserted to the text.

8. The dialog processing system of claim 7, wherein the result processor is configured to generate the rule based on a reply of the user and compare the rule with a rule pre-stored in the storage.

9. A dialog processing method comprising:
receiving information sent from the outside and circumstantial information;
storing a rule and a dialog template related to the rule;
comparing a condition of the rule and the information to generate a determined rule;
determining to express the determined rule based on the determined rule and the circumstantial information collected from the outside;
determining a point in time to start a dialog based on a cognitive load value and a reference cognitive load value; and
creating, by a result processor, text to be expressed based on the determined rule and the dialog template and outputting the text according to a signal generated while determining to express the determined rule,
wherein a situation determiner is configured to determine the cognitive load value of a user based on the circumstantial information,
wherein the cognitive load value refers to an extent to which the user recognizes the text output from the result processor,
wherein the reference cognitive load value is included in the determined rule, wherein the determining of expressing the determined rule includes determining the rule as the determined rule when a condition included in the rule corresponds to the information, wherein the situation determiner is configured to send the signal to the result processor according to priorities of a plurality of determined rules stored in a storage to start the dialog, wherein the determining of expressing the determined rule includes determining a duration time based on the circumstantial information, and wherein the determining of expressing the determined rule includes setting priority on each of the plurality of determined rules stored by comparing the determined cognitive load value and the reference cognitive load value included in the determined rule.

10. The dialog processing method of claim 9, wherein the creating of the determined rule includes inserting the information to the determined rule and storing a resultant rule in the storage.

11. The dialog processing method of claim 9, wherein the determining of expressing the determined rule includes setting the priority on each of the plurality of determined rules stored by comparing an utterance time included in the determined rule and the duration time.

12. The dialog processing method of claim 9, wherein the determining of expressing the determined rule includes selecting one event of events stored in the storage based on the information.

13. The dialog processing method of claim 12, wherein the determining of expressing the determined rule includes determining whether there is a plurality of rules associated with the one event.

14. The dialog processing method of claim 13, wherein the determining of expressing the determined rule includes determining one of the plurality of rules associated with the one event as the determined rule when the rule has a condition corresponding to the information.

15. The dialog processing method of claim 9, wherein outputting of the text includes inserting information included in the determined rule to the text.

16. The dialog processing method of claim 15, wherein outputting of the text includes creating the rule based on a reply of the user and comparing the rule with a rule pre-stored in the storage.

17. A vehicle comprising:
a communication device configured to receive information sent from the outside thereof and circumstantial information sent from the vehicle;
a storage configured to store a rule and a dialog template related to the rule;
a rule determiner configured to compare a condition of the rule and the information to generate a determined rule;
a situation determiner configured to determine to express the determined rule based on the determined rule and the circumstantial information collected from the vehicle; and
a result processor configured to generate text to be expressed based on the determined rule and the dialog template and output the text through a controller of the vehicle according to a signal sent from the situation determiner,
wherein the situation determiner is configured to determine a cognitive load value of a user based on the circumstantial information, wherein the situation determiner is configured to determine a point in time to start a dialog based on the cognitive load value and a reference cognitive load value, wherein the cognitive load value refers to an extent to which the user recognizes the text output from the result processor, and wherein the reference cognitive load value is included in the determined rule, and wherein the rule determiner is configured to determine the rule as the determined rule when a condition included in the rule corresponds to the information, and wherein the situation determiner is configured to send the signal to the result processor according to priorities of a plurality of determined rules stored in the storage to start the dialog, wherein the situation determiner is configured to determine a duration time based on the circumstantial information sent from the vehicle, and wherein the situation determiner is configured to set a priority on each of the plurality of determined rules stored by comparing the determined cognitive load value and the reference cognitive load value included in the determined rule and comparing an utterance time included in the determined rule and the duration time.

18. The vehicle of claim 17, wherein the situation determiner is configured to select the priority based on the reference cognitive load value when overlapping rules are selected based on results of the comparing.

19. The vehicle of claim 17, wherein the result processor is configured to control the controller included in the vehicle to output the text and control the controller to provide a service related to a result of the determining.

20. The vehicle of claim 17, wherein the rule determiner is configured to collect driving condition information related to the user from the controller and compare a condition of the rule and the driving condition information.

21. The vehicle of claim 17, wherein the result processor is configured to determine information included in the determined rule as a factor to be inserted to the text.

* * * * *